United States Patent [19]
Chau et al.

[11] Patent Number: 5,764,750
[45] Date of Patent: Jun. 9, 1998

[54] COMMUNICATING BETWEEN DIVERSE COMMUNICATIONS ENVIRONMENTS

[75] Inventors: Toan Chau; Charles H. Parker, both of Broomfield; Dennis R. Sanger, Westminster, all of Colo.

[73] Assignee: Lucent Technologies, Inc., Murray Hill, N.J.

[21] Appl. No.: 657,733

[22] Filed: May 31, 1996

Related U.S. Application Data

[63] Continuation-in-part of Ser. No. 286,839, Aug. 5, 1994, Pat. No. 5,550,906.

[51] Int. Cl.$^6$ .................................................. H04J 3/12
[52] U.S. Cl. .......................... 379/229; 379/225; 379/268; 370/467
[58] Field of Search .................................. 370/466, 467, 370/401; 379/268, 269, 93.15, 100.13, 229, 225

[56] References Cited

U.S. PATENT DOCUMENTS

| | | |
|---|---|---|
| 3,790,717 | 2/1974 | Abramson et al. . |
| 4,313,036 | 1/1982 | Jabara et al. . |
| 4,488,004 | 12/1984 | Bogart et al. . |
| 4,535,448 | 8/1985 | Baxter et al. . |
| 4,680,786 | 7/1987 | Baker et al. . |
| 4,706,242 | 11/1987 | Harland . |
| 4,710,917 | 12/1987 | Tompkins et al. . |
| 4,720,850 | 1/1988 | Oberlander et al. . |
| 4,763,317 | 8/1988 | Lehman et al. . |
| 4,811,335 | 3/1989 | van Baardwijk et al. . |
| 4,878,240 | 10/1989 | Lin et al. ................................. 379/67 |
| 4,893,307 | 1/1990 | McKay et al. . |
| 4,903,261 | 2/1990 | Baran et al. . |
| 5,051,982 | 9/1991 | Brown et al. . |
| 5,093,827 | 3/1992 | Franklin et al. . |
| 5,159,594 | 10/1992 | Bales et al. . |
| 5,182,748 | 1/1993 | Sakata et al. ........................... 370/466 |
| 5,182,750 | 1/1993 | Bales et al. . |
| 5,305,312 | 4/1994 | Fornek et al. . |
| 5,319,640 | 6/1994 | Yamasaki et al. ...................... 379/229 |
| 5,450,123 | 9/1995 | Smith ...................................... 348/17 |
| 5,473,367 | 12/1995 | Bales et al. ............................ 348/16 |
| 5,521,924 | 5/1996 | Kakuma et al. ........................ 370/466 |
| 5,530,434 | 6/1996 | Kanda ..................................... 370/466 |

OTHER PUBLICATIONS

H. Newton, *A Microsoft Fantasy*, Computer Telephony, 1994 Jan./Feb., pp. 9, 10, 12, 15, and 16.
*IEEE Spectrum*, (Jun. 1994), vol. 31, No. 6, Fig. 4, p. 53.
*Understanding TAO*, Computer Telephony, Feb. 1996, vol. 4, Issue 2, pp. 141–142, 144, 147–151, 153–156, 158, 160, and 162.

*Primary Examiner*—Ahmad F. Matar
*Attorney, Agent, or Firm*—David Volejnicek

[57] ABSTRACT

Voice calls between multimedia workstations (1937–1939) of a LAN-based client-server multimedia communications system (1911) and telephones (1918–1919) of a telephone system (1912) are effected by an interface that comprises a pair of ISDN ports (1920 and 1940) interconnected by an ISDN link (1910) and that transfers ISDN control signals and user communications between the LAN (1936) and the telephone switching fabric (1916), and by proxy-user client software (21210 and 21212) that executes on the server (1933) of the multimedia system and converts control signals between the ISDN signals of the ISDN interface and a call processor (1914) of a telephone switching system (1913), and the middleware signaling of the server and its client workstations. The proxy-user client software comprises an object-oriented programming object, and each telephone that is engaged in a call with a workstation is represented in the multimedia system by its own instance (21210-1 to 21210-2) of the object.

15 Claims, 27 Drawing Sheets

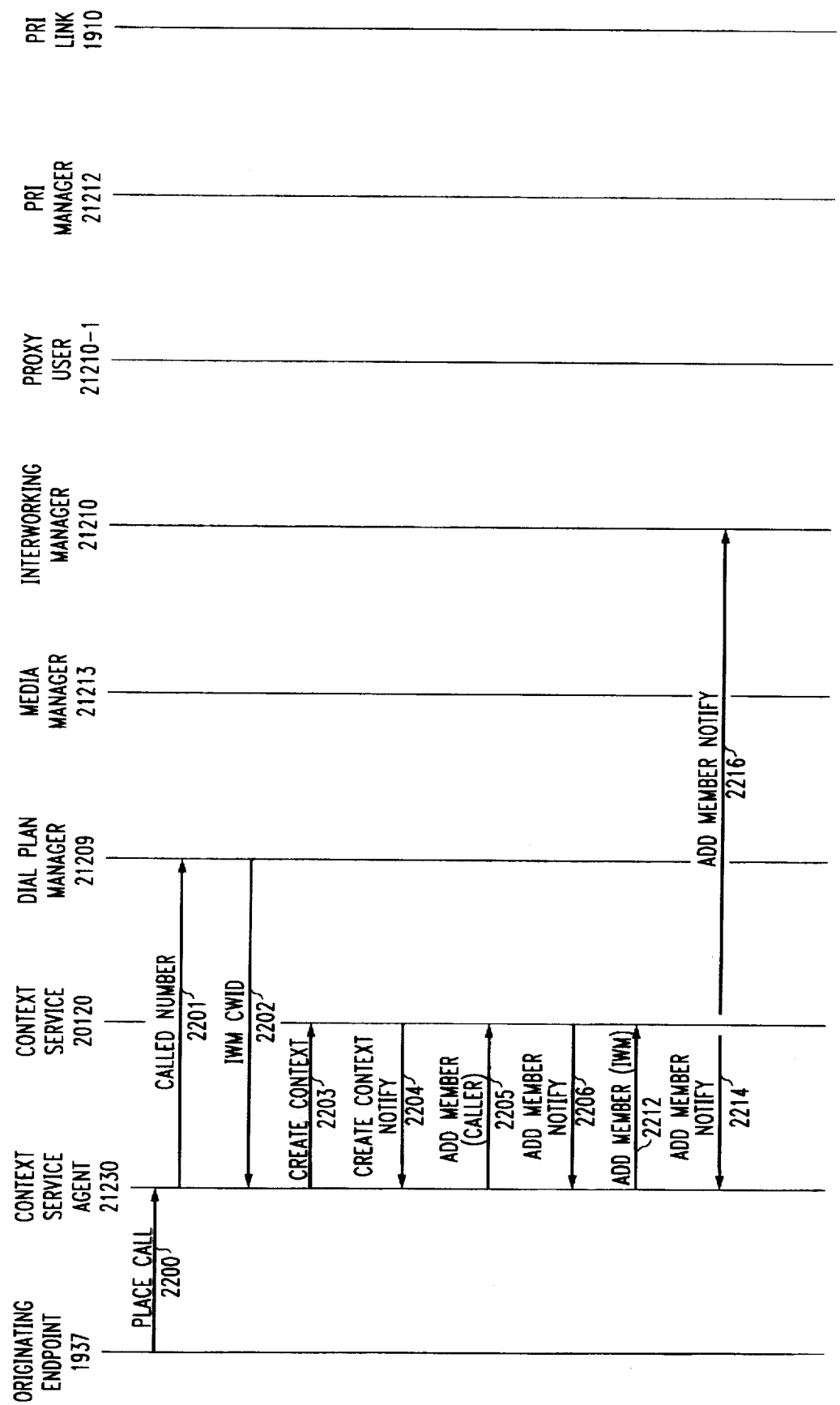

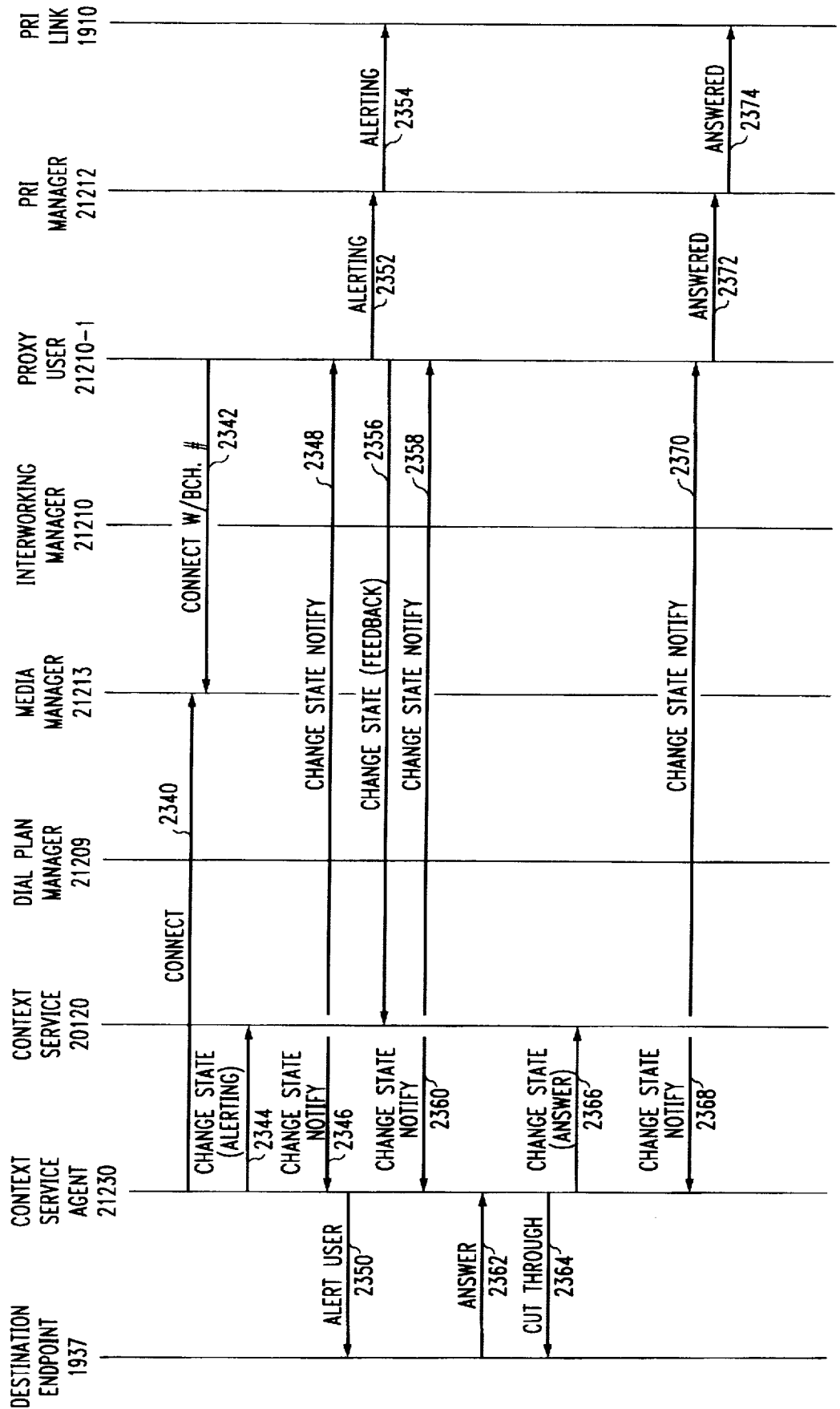

COMMUNICATING BETWEEN DIVERSE COMMUNICATIONS ENVIRONMENTS

CROSS-REFERENCE TO RELATED APPLICATION

This application is a continuation-in-part of an application of T. Chau and R. E. Heffner entitled "Telecommunications Feature-Server". Ser. No. 08/286,839, filed on Aug. 5, 1994, now U.S. Pat. No. 5,550,906.

TECHNICAL FIELD

This invention relates to telecommunications systems.

BACKGROUND OF THE INVENTION

The client-server architecture is becoming prevalent in transaction-processing systems, including telecommunications systems. In the client-server architecture, an endpoint computing device or software, called a "client", uses resources that are managed by another computing device or software, called a "server", that is networked with the client by a network fabric (e.g., a local area network (LAN), a metropolitan area network (MAN), a wide area network (WAN), a telephone switching system's switching fabric, or some other communications medium). The client requests and receives information, services, and/or use of physical resources, from the server. The clients and the server interact with each other according to a predefined protocol.

Different telecommunications systems often use different protocols. The individual protocols are generally supported by, and dependent upon, particular capabilities of the telecommunications endpoints (e.g., clients in the client-server systems). This fact sometimes, though not always, complicates interworking (interconnection) and cooperation between different telecommunications systems.

Telecommunications systems whose protocols are the same can be interconnected via repeaters. Telecommunications systems whose different protocols require the same capabilities of the endpoints can be interconnected via protocol converters. But there is a problem in interconnecting telecommunications systems whose different protocols require different capabilities of the endpoints, because the endpoints of one system often do not possess the capabilities required by the other system and hence cannot support the other system's protocol.

SUMMARY OF THE INVENTION

This invention is directed to solving these and other problems and disadvantages of the prior art. Generally according to the invention, there is provided a software entity in a local telecommunications system, which acts in the local telecommunications system as a representative, a proxy, of endpoints of a remote different telecommunications system. The proxy provides, on behalf of the represented remote endpoints, the capabilities required of endpoints by the local system and its protocol in order to allow the local and the remote endpoints to communicate with each other, and to do so in the same manner as they communicate with endpoints in their own system.

Specifically according to the invention, the invention is directed to a telecommunications system, a proxy user arrangement for the telecommunications system, and a method of communicating between endpoints in the telecommunications system. The telecommunications system includes a plurality of first user terminals (e.g., multimedia communications client workstations or other end points), a first communications medium (e.g., a LAN) interconnecting the first user terminals, a first call processor (e.g., a multimedia communications server) for interacting with the first user terminals via a first protocol (e.g., a middleware protocol) to effect communications sessions between the first user terminals over the first communications medium, a plurality of second user terminals (e.g., telephones or workstations or other end points), a second communications medium (e.g., a telephone switching fabric or a LAN) interconnecting the second user terminals, and a second call processor (e.g., the control processor of a telephone switching system or H.323 protocol processors of the workstations) for interacting with the second user terminals via a second protocol (e.g., an ISDN protocol or the H.323 protocol) different from the first protocol to effect communications sessions between the second user terminals over the second communications medium. The proxy user arrangement connects to the first and the second medium and interacts on behalf of a second user terminal with the first call processor via the first protocol like the first user terminals, and interacts on behalf of a first user terminal with the second call processor via the second protocol like the second user terminals. The proxy user arrangement thereby causes the first call processor and the second call processor to effect a communications session between the first user terminal and the second user terminal over the first and the second communications medium.

Illustratively, the first call processor comprises a stored-program-controlled server of a client-server system which executes a server program, each first user terminal comprises a stored-program controlled client of the client-server system which executes a client program, and the proxy user arrangement comprises a client program which executes on the server. Also illustratively, the client program comprises an object-oriented-programming object and each second user terminal that is involved in a communications session with a first user terminal is represented in the server by a separate instance of the object. Preferably, the proxy user arrangement comprises a control signaling arrangement (e.g., the client program executing on the server) that interacts with the two call processors via control signals that correspond to the control signals of their respective protocols, and an interface arrangement (e.g., one or more port circuits) that transfers terminal-user communications between the two media. Such a configuration simplifies the implementation of the proxy user arrangement, and makes it fit well with client-server telecommunications system architectures.

These and other advantages and features of the present invention will become more apparent from the following description of an illustrative embodiment of the invention taken together with the drawing.

BRIEF DESCRIPTION OF THE DRAWING

FIGS. 3 and 7–8 are a flow diagram of functions performed by the control processes of FIG. 2 to establish a call originated by a workstation between the workstation and a telephone set in the system of FIG. 1;

FIGS. 14 and 5 are a flow diagram of functions performed by the control processes of FIG. 2 to add a workstation as a conferee to a call between workstations in the system of FIG. 1;

FIGS. 16 and 8 are a flow diagram of functions performed by the control processes of FIG. 2 to add a telephone set as a conferee either to a call between workstations or to a call between a workstation and a telephone set at the workstation's request in the system of FIG. 1;

FIGS. 22A–22C are a signaling flow diagram of control signals of elements of the system of FIGS. 19–21 for an outgoing call scenario;

FIGS. 23A–23B are a signaling flow diagram of control signals of elements of the system of FIGS. 19–21 for an incoming call scenario.

DETAILED DESCRIPTION

Figure 1:
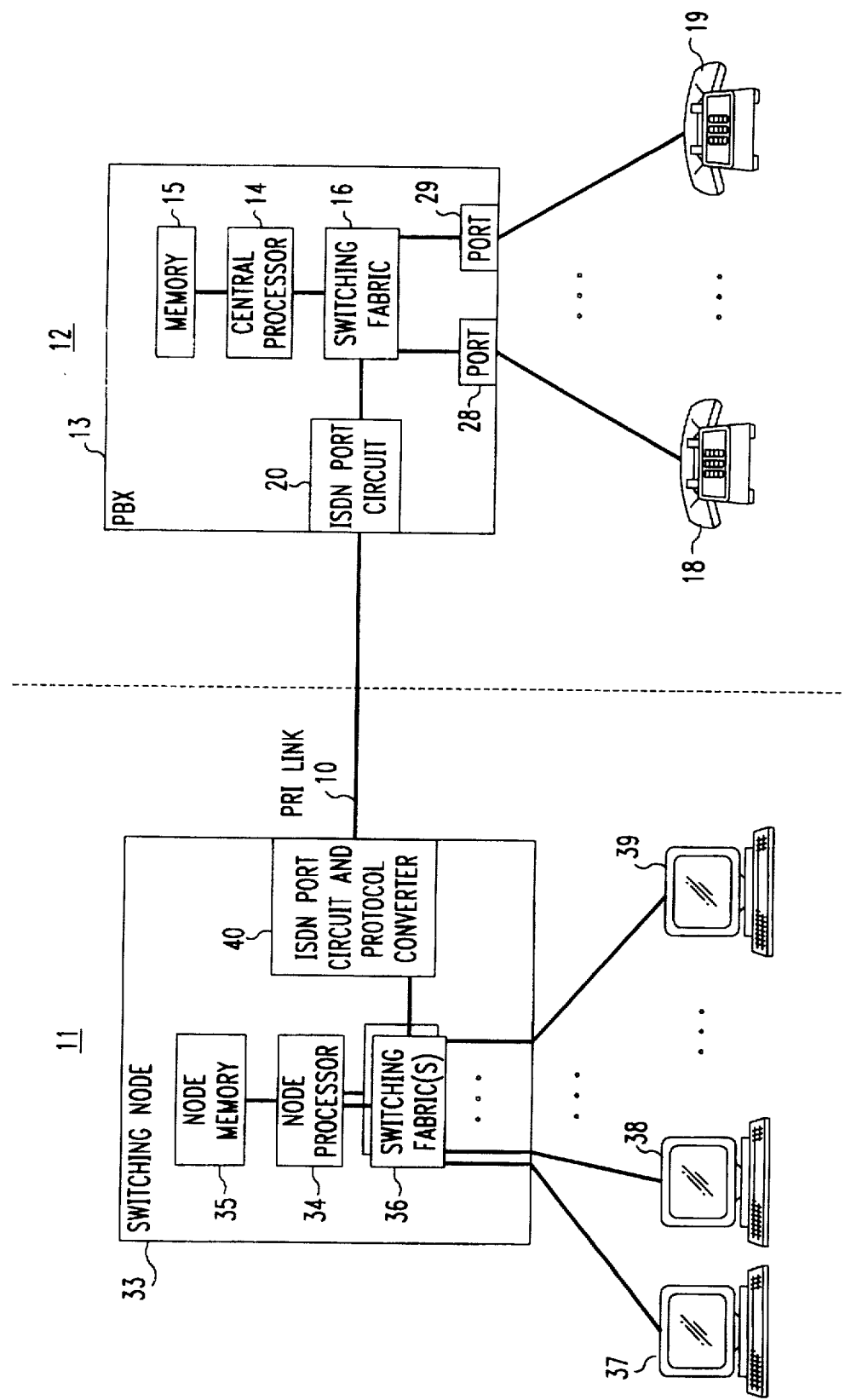
FIG. 1 is a block diagram of an illustrative telecommunications system that embodies an example of the invention.

FIG. 1 shows an illustrative telecommunications system that embodies an example of the invention. The system of FIG. 1 is made up of two communications subsystems 11 and 12 that are interconnected by a communications link 10. Only two subsystems are shown for simplicity; a plurality of subsystems 11 may be connected to (and served by, as discussed below) subsystem 12. Both subsystems 11 and 12 are substantially conventional. Subsystem 12 is a feature-rich subsystem, such as a telephony subsystem. Subsystem 12 illustratively comprises a telephony switching system, such as a private branch exchange (PBX) 13 that provides basic (e.g., telephony voice) communications services to a plurality of telephone sets 18–19. PBX 13 is a stored-program-controlled machine, such as an AT&T Definity® PBX. It includes a central processor 14 that executes control programs out of its memory 15 and controls a switching fabric 16 that provides basic communications connections between telephone sets 18–19 as well as other endpoints in a conventional manner.

Subsystem 11 may be substantially any desired communications arrangement. For example, it may be another telephony subsystem, like subsystem 12. Preferably, however, subsystem 11 is a connections-rich subsystem, such as a data or a multi-media communications subsystem. Subsystem 11 illustratively comprises a switching node 33, for example a local area network (LAN) server, a broadband multi-media switching hub, or an asynchronous transfer mode (ATM) packet switch, that provides data or multi-media communications services to a plurality of endpoints such as user workstations 37–39. Switching node 33 includes a node processor 34 that executes switching-node control programs out of node memory 35 and controls one or more switching fabrics 36 (e.g., LAN, crosspoint switch, etc.) that provide communications connections between workstations 37–39 as well as other endpoints. For purposes of this discussion, the principal function performed by node processor 34 is that of a name-server or router: it converts connection requests (received from workstations 37–39) that are expressed in terms of originating and terminating endpoint names and/or addresses into corresponding connections (with the aid of PBX 13, as will be made clear below).

Communications link 10 that interconnects subsystems 11 and 12 is illustratively an ISDN primary-rate interface (PRI) link that terminates at PBX 13 in a conventional ISDN port circuit 20. Though only one PRI link 10 is shown, a plurality may be used for greater inter-subsystem communications capacity. If switching node 33 uses the ISDN transmission protocol, PRI link 10 also terminates in just an ISDN port circuit 40 at switching node 33. If switching node 33 uses a different transmission protocol, PRI link 10 terminates at node 33 in an ISDN port circuit and protocol converter 40. ISDN port circuit and protocol converter 40 not only terminates the ISDN transmission protocol of PRI link 10 but converts between the ISDN transmission protocol and the internal transmission protocol of node 33, in a conventional manner.

PBX 13 provides voice connections and its conventional repertoire of telephony features to telephone sets 18–19 in a conventional manner, independently of subsystem 11. PBX 13 also provides the features to workstations 38–39 through switching node 33. Hence, PBX 13 acts as a feature server with respect to switching node 33, which in turn acts as a client of PBX 13, in a client-server type of arrangement. Switching node 33 provides its conventional repertoire of connections to workstations 37–39 in conjunction with the features provided by PBX 13. Specifically, switching node 33 provides the connections to workstations 37–39 that result from, and effect, the features being provided by PBX 13 to workstations 37–39. These may, and generally will, include connections other than, or more varied than, those provided by PBX 13 to telephone sets 18–19, such as image, video, and data connections. Additionally, switching node 33 may provide features to workstations 37–39 out of its feature repertoire that are additional to those provided by PBX 13 (e.g., video broadcasting and video-on-demand). Connections and features that are provided by switching node 33 to workstations 37–39 and that are beyond those provided by PBX 13 are referred to herein (from the telephony perspective) as enhanced services. Under the direction of PBX 13, PBX 13 and switching node 33 cooperate to provide telephony (voice communications) connections between telephone sets 18–19 and workstations 37–39.

Figure 2:
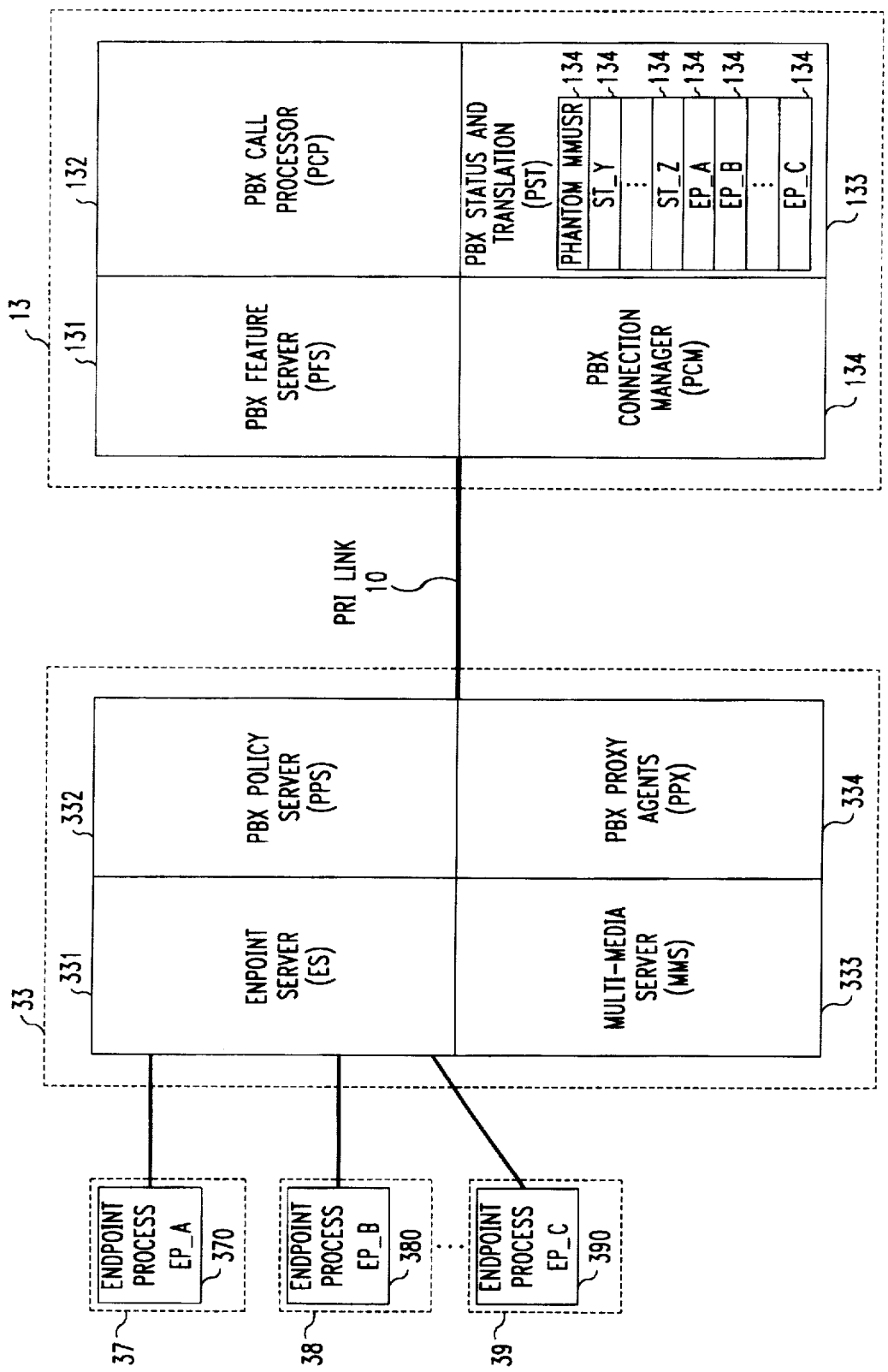
FIG. 2 is a block diagram of relevant control processes and data structures of the system of FIG. 1.

FIG. 2 illustrates the configuration of control processes and data structures in the system of FIG. 1 that are relevant to this discussion. These control processes and data structures exist at the application layer (layer 7) of the ISO's OSI model of software architecture. Control processes and data structures that exist at the lower levels and that support the application layer processes are not important hereto and are of conventional design; hence, they are not shown. The control processes and data structures of PBX 13 are stored in memory 15, and central processor 14 executes the control processes out of memory 15 and makes use of the data structures in memory 15 during execution. Similarly, the control processes of switching node 33 are stored in node memory 35 from where they are executed by node processor 34, and control processes of workstations 37–39 are stored in workstation memories and are executed therefrom by workstation processors.

As indicated in FIG. 2, PBX 13 includes a conventional PBX status and translations database (PST) 133 that stores information about each endpoint (EP) (e.g., telephone set 18–19) served by PBX 13. Each endpoint's one or more corresponding entries 134 in PST 133 contain information that includes the extension number that is assigned to the endpoint, the name of the user who is associated with the endpoint, the permissions for the endpoint, the features that are assigned to and activated for the endpoint, and the present status of that endpoint (e.g., idle, busy). For each endpoint that is connected directly to PBX 13 (i.e., each telephone set 18–19), the information also includes the identifying number of the PBX port 28–29 (see FIG. 1) to which the endpoint is connected. Because PBX 13 is also required, in the system of FIG. 1, to provide services to other endpoints (i.e., workstations 37–39), PST 133 must contain information entries 134 for these endpoints as well. However, because these endpoints are not connected directly to PBX 13, their entries 134 in PST 133 differ from the entries 134 for telephone sets 18–19 in that they do not include a port identifier. Administration of information for a (generally physically non-existent, or virtual) endpoint without including an associated port identifier is commonly referred to as "administration without hardware", which is a conventional capability provided on the AT&T Definity PBX. PST 133 also includes call records for all presently-existing calls.

PBX 13 control processes include conventional PBX call processing (PCP) 132, which implements features on PBX 13. With respect to endpoints, such as telephone sets 18–19, which are administered in PST 133 with a corresponding port number, PCP 132 calls upon a conventional PBX connection manager (PCM) 134 to set up or tear down any connections that PCP 132 specifies. With respect to endpoints, such as workstations 38–39, that are administered without hardware, PCP 132 calls upon another pre-specified entity. In this case, the entity is a control process referred to as a PBX feature server (PFS) 131.

PFS 131 provides external access to features which PBX 13 conventionally provides only to endpoints—telephone sets 18–19—that are directly connected to and directly served by PBX 13. PCP 132 acts as an interface between PFS 131 and ISDN port circuit 20, conveying signaling information that is received by ISDN port circuit 20 over the signaling channel (D channel) of PRI link 10 to PFS 131, and conveying control information generated by PFS 131 with respect to workstations 37–39 to ISDN port circuit 20 for transmission over the control channel of PRI link 10. PFS 131 terminates a PRI temporary signaling connection (CCITT Q.932 signaling) via PCP 132, and performs actions based on the CCITT Q.932 messaging protocol that is carried by Q.931 signaling on the signaling channel. PFS 131 makes the existence of subsystem 11 transparent to PBX 13: as far as PBX 13 is aware, it merely has a conventional ISDN trunk connection (PRI link 10) to the external world, and it is conventionally administered with a plurality of seemingly-virtual endpoints (workstations 37–39).

Control processes of switching node 33 include a PBX policy server (PPS) 332 whose function is to provide access for workstations 37–39 to PBX 13 features by means of communicating with PFS 131 via PRI link 10, an endpoint server (ES) 331 whose function is to provide call-request handling between workstations 37–39, and a multi-media server (MMS) 333 whose function is to provide and manage various types or media of connections (e.g., audio, video, image) between workstations 37–39 and other endpoints as requested. PPS 332 is subsystem 11's counterpart to PFS 131, ES 331 is the counterpart to PCP 132, and MMS 333 is the counterpart to PCM 134. The control processes of switching node 33 further include a PBX proxy agent (PPX) 334 which functions as a connection server to PRI link 10 to facilitate calls between workstations 37–39 and telephone sets 18–19. A separate instance of PPX 334 is created for each telephone set 18–19 that is presently involved in a call between workstations 37–39 and telephone sets 18–19. To the extent that instances of PPX 334 represent telephone sets 18–19 in subsystem 11, the instances of PPX 334 may be thought of as counterparts to virtual endpoints on PBX 13.

Control processes of workstations 37–39 are referred to herein as endpoint processes (EPs) 370–390, a corresponding one per workstation 37–39. Their function is to communicate with ES 331 and PPS 332 to obtain requested services (e.g., communications connections) for their corresponding workstations 37–39.

While PRI link 10 is a conventional ISDN link utilizing the conventional ISDN transmission protocol, two message sets are carried by this transmission medium: the standard ISDN message set used for messages exchanged between PPX 334 and PCP 132, and an FSA message set used for messages exchanged between PPS 332 and PFS 131. The FSA is a Q.932 Remote Operation Service Element (ROSE) -based protocol which is carried by Q.931 USERINFO messages across PRI link 10. The FSA message set includes transaction-origination (MAKE_CALL), transaction-progress acknowledgment (OPERATION_PROCEED), originating party class-of-restriction/class-of-service validation (ORIG_PARTY), call destination (TERM_PARTY), disconnect (CLEAR_CALL), event notification of various events such as call-progress events, e.g., connect, busy, out-of-service, etc. (EVENT_NOTIFICATION), ongoing-transaction requests (ADD_PARTY_TO_CALL and DROP_PARTY_FROM_CALL), and transaction-completion indication (RETURN_RESULT or RETURN_ERROR) messages. For handling conference calls, the FSA message set also includes ADD_PARTY and DROP_PARTY messages.

The following call scenarios illustrate the requirements for the above-mentioned control processes, and the manner in which PBX 13 provides features therethrough for workstations 37–39 of subsystem 11.

Figure 3:
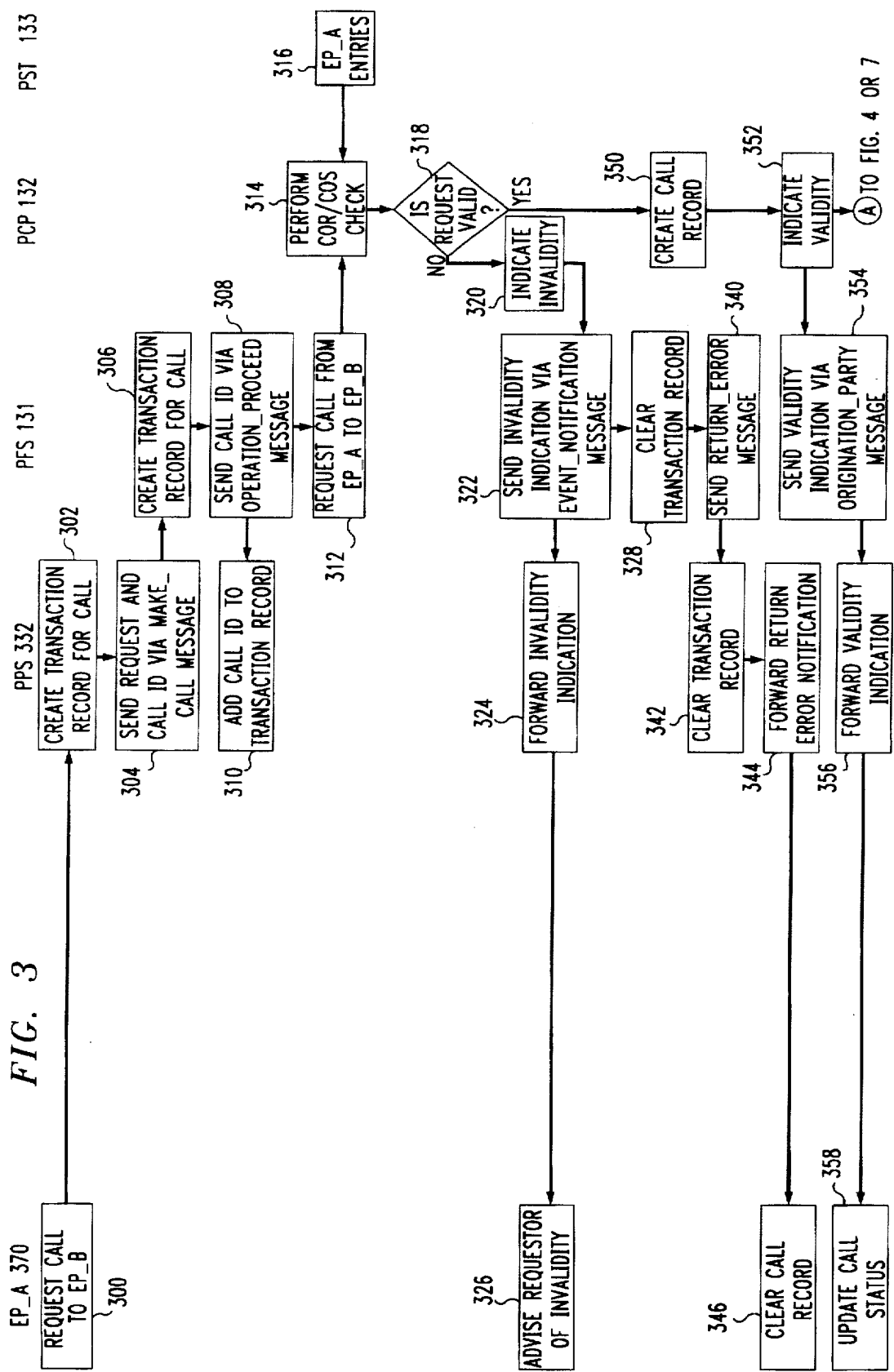
FIGS. 3–5 are a flow diagram of functions performed by the control processes of FIG. 2 to establish a call between workstations in the system of FIG. 1.
Figure 4:
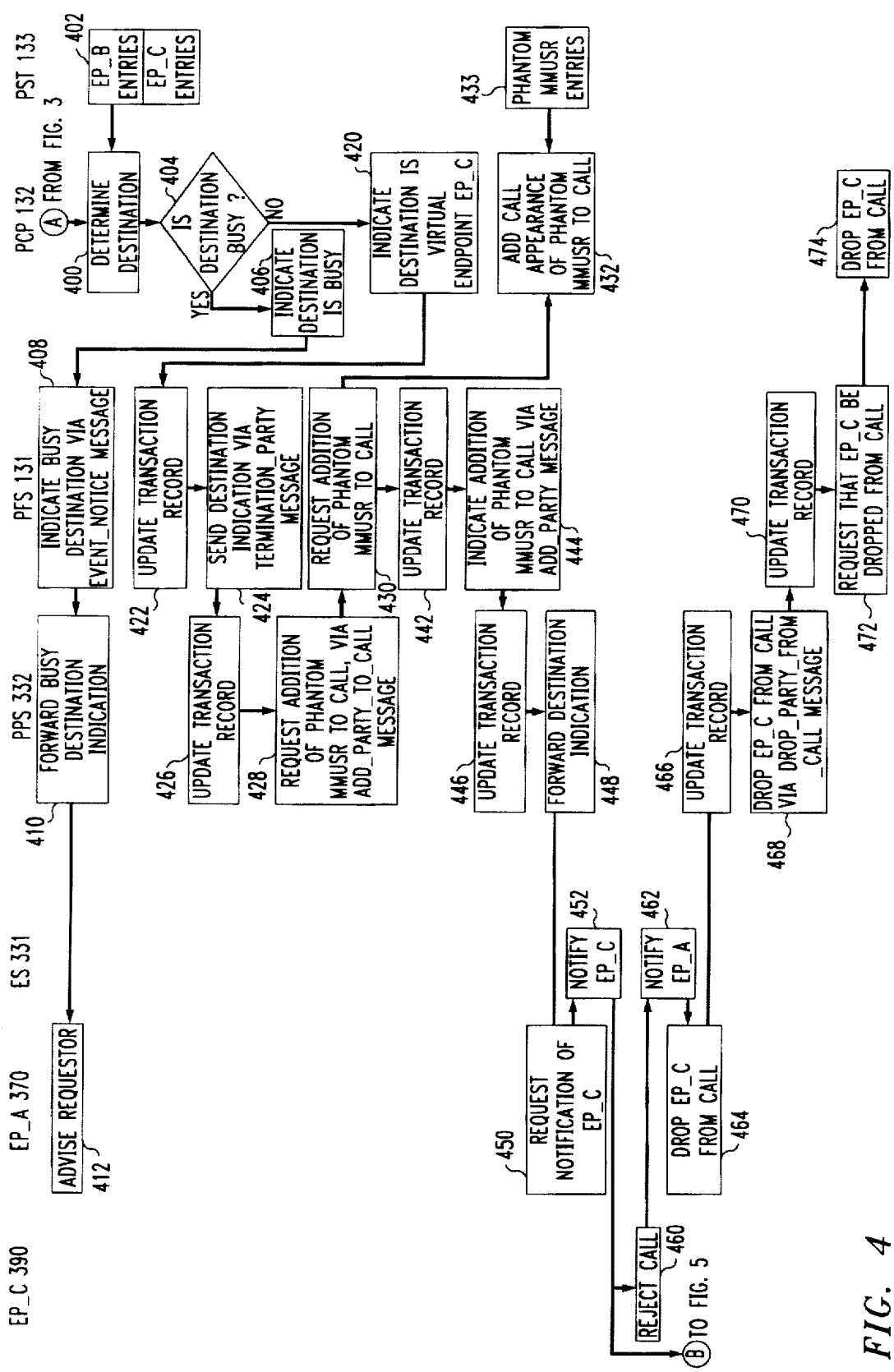
Figure 5:
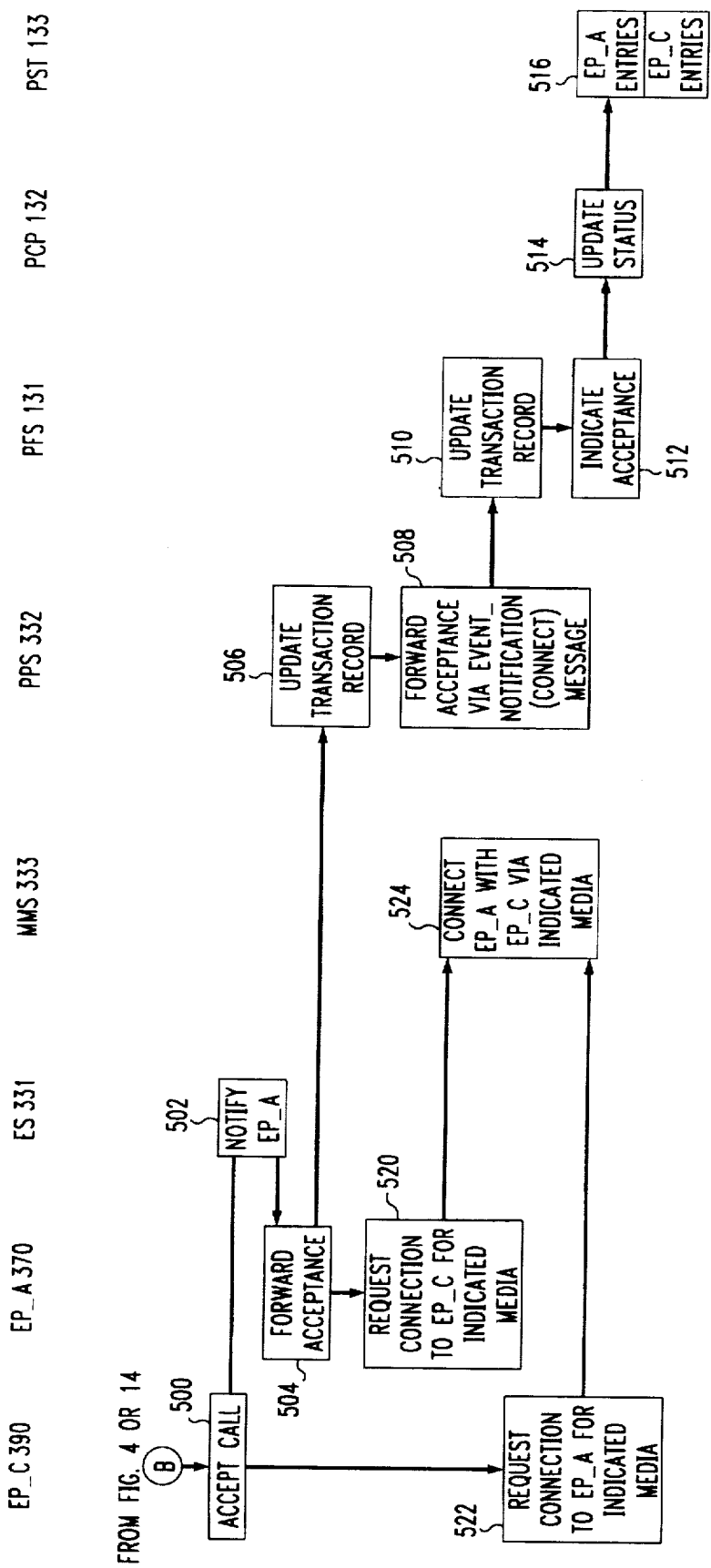

FIGS. 3–5 illustrate a scenario for call-establishment between two of the workstations 37–39. A workstation 37 initiates the call, for example in response to a request from a user of workstation 37, by means of its EP_A 370 sending a request for a call to workstation 38 (EP_B) to PPS 332, at step 300. In the request, EP_A 370 identifies the desired call destination (workstation 38) in some way, such as by name, address, or extension number. PPS 332 receives the request and creates a transaction record for the call, at step 302. Transaction records kept by PPS 332 and PFS 131 for each inter-subsystem call tie together the knowledge of the calls between PPS 332 and PFS 131. The transaction record identifies the originating endpoint and address digits, and includes a call identifier that PPS 332 assigns to this call. PPS 332 then sends the request and the call identifier to PFS 131 across PRI link 10 via a MAKE_CALL message, at step 304. PFS 131 receives the MAKE_CALL message and creates a transaction record for the call, at step 306. The transaction record identifies the originating endpoint and address digits, and includes both the call identifier assigned by PPS 332 as well as a call identifier that PFS 331 assigns to this call. PFS 331 then sends this latter call identifier to PPS 332 across PRI link 10 via an OPERATION_PROCEED message, at step 308. PPS 332 receives the OPERATION_PROCEED message and enters the call identifier assigned by PFS 331 in its own transaction record for the call, at step 310. PPS 332 and PFS 331 can now exchange communications about the call with each other by identifying the call in the message by the message recipient's own call identifier.

Following step 308, PFS 131 makes a request to PCP 132, via internal signaling of PBX 13, for a call from workstation 37 to the address digits, at step 312. PCP 132 receives the request and performs a conventional class-of-restriction/class-of-service (COR/COS) check on the request, at step 314, by examining entries 134 for workstation 37 (EP_A) in PST 133, as indicated at step 316. This is the first service feature that PBX 13 provides for subsystem 11. Depending on the results of the COR/COS check, as indicated at step 318, PCP 132 indicates either invalidity or validity of the call request to PFS 131, at step 320 or 350, respectively.

If the indication is one of invalidity, at step 320, PFS 131 sends the invalidity indication across PRI link 10 via an EVENT_NOTIFICATION message, at step 322. PPS 332 receives the message and forwards the invalidity indication to EP_A 370, at step 324. EP_A 370 then notifies the requestor at workstation 37 of the invalidity of the request, at step 326.

Following step 322, PFS 131 clears its transaction record for this call, at step 328, and sends a RETURN_ERROR message across PRI link 10 to PPS 332, at step 340. PPS 332 receives the message and in turn clears its transaction record for this call, at step 342. PPS 332 then forwards a return-error notification to EP_A 370, at step 344. EP_A 370 receives the notification and clears its call record for this call, at step 346. The call thus comes to an unsuccessful end.

Returning to step 318, if the COR/COS check passed, PCP 132 creates a call record for the call, at step 350, and sends a validity indication to PFS 131, at step 352. PFS 131 receives the validity indication and sends it across PRI link 10 via an ORIGINATION_PARTY message, at step 354. PPS 332 receives the message and forwards the validity indication to EP_A 370, at step 356. EP_A 370 receives the indication and updates its call status for the call therewith, at step 358.

After indicating request validity at step 352, PCP 132 determines the destination of the call to be workstation 38, at step 400 of FIG. 4, by applying the address digits to the contents of PST 133. This is the second service feature that PBX 13 provides for subsystem 11. Assume, for example, that entries 134 in PST 133 for workstation 38 indicate that workstation 38 subscribes to a call-forwarding feature which is activated and which designates workstation 39 as the forwarding endpoint. By examining entries 134 for workstation 38 (EP_B), at step 402, PCP 132 makes this determination, and in turn examines entries 134 for workstation 39 (EP_C) to determine if they further affect the call destination, also at step 402. Assume that entries 134 for EP_C do not affect the call destination further. PCP 132 therefore determines at step 400 from contents of PST 133 that the call destination is workstation 39 (EP_C), and further determines from those contents that EP_C is a virtual endpoint. It also determines from those contents whether or not the endpoint is busy, at step 404. If EP_C is busy (and its entries do not specify a coverage point that can be substituted as the destination for the call), PCP 132 notifies PFS 131 that the endpoint is busy and therefore cannot be reached, at step 406. PFS 131 receives the busy indication and sends it across PRI link 10 via an EVENT_NOTIFICATION message, at step 408. PPS 332 receives the message and forwards the busy notification on to EP_A 370, at step 410. EP_A 370 advises the requestor of the destination's busy state, at step 412. It is now up to the requestor or to EP_A 370 to decide what to do next. Typically, EP_A 370 requests that the call be cleared, at which point the scenario follows steps 622 et seq. of FIG. 6, discussed below.

If PCP 132 finds the endpoint EP_C to not be busy at step 404, it notifies PFS 131 that the destination is the virtual endpoint EP_C, at step 420. PFS 131 receives the destination indication and updates its transaction record for the call accordingly, at step 422. PFS 131 also sends the destination indication across PRI link 10 via a TERMINATION_PARTY message, at step 424. PPS 332 receives the message and updates its transaction record for the call accordingly, at step 426. PPS 332 then requests the addition of a phantom endpoint, referred to as phantom MMUSR, to the call, by sending an ADD_PARTY_TO_CALL message to PFS 331, at step 428. The phantom endpoint MMUSR is administered in PST 133 of PBX 13 as a virtual endpoint with many call appearances. It is used to enable single-party calls to exist on PBX 13, as will be made clear further below. PFS 131 receives the message and requests PCP 132 to add phantom MMUSR to the call, at step 430. PCP 132 responds by adding a call appearance of phantom MMUSR to the call, at step 432, modifying entries 134 for phantom MMUSR in PST 133 in the process, as indicated at step 433. PFS 131 then updates its transaction record accordingly, at step 442, and indicates to PPS 332 that phantom MMUSR has been added to the call, by sending an ADD_PARTY message across PRI link 10, at step 444. PPS 332 receives the message and updates its transaction record accordingly, at step 446. PPS 332 also forwards the indication, received at step 426, that workstation 39 (EP_C) is the destination of the call, to EP_A 370, at step 448. EP_A 370 receives the destination indication and requests ES 331 to notify EP_C 390 and offer it a call from EP_A 370 in a particular medium, at step 450. ES 331 notifies EP_C 390, at step 452. The notice indicates the medium or media in which the call is to be conducted.

EP_C 390 can either accept or reject the call. If it rejects the call, it so notifies ES 331, at step 460. ES 331 in turn notifies EP_A 370, at step 462. It is now up to EP_A 370 to decide how to proceed. Normally, however, EP_A 370 responds by requesting PPS 332 to drop the call destination (EP_C) from the call, at step 464. PPS 332 receives the request and updates its transaction record accordingly, at step 466. PPS 332 also sends a DROP_PARTY_FROM_CALL message across PRI link 10 requesting that EP_C be dropped from the call, at step 468. PFS 131 receives the message and updates its transaction record accordingly, at step 470. PFS 131 also requests PCP 132 to drop EP_C from the call, at step 472. PCP 132 does so, at step 474. It is now up to the user of workstation 37 or to EP_A 370 to decide what to do next. Choices include selecting another destination for the call (a repeat of the scenario of FIG. 3), or clearing the call (see steps 622 et seq. of FIG. 6).

If, after being offered the call at step 452, EP_C 390 decides to accept the call, it so notifies ES 331, at step 500 of FIG. 5. EP_C 390 also sends a request to MMS 333 to establish a unidirectional connection from workstation 39 to workstation 37 in whatever medium or media were indicated for the call, at step 522. Meanwhile, ES 331 receives the indication of call acceptance from EP_C 390 and forwards it to EP_A 370, at step 502. EP_A 370 receives the acceptance indication and forwards it to PPS 332, at step 504. EP_A 370 also sends a request to MMS 333 to establish a unidirectional connection from workstation 37 to workstation 39 (EP_C 390) in whatever medium or media its original call request encompassed, at step 520. MMS 333 receives the connection requests from EP_A 370 and EP_C 390 and establishes the requested unidirectional connections between workstations 37 and 39, at step 524. Providing the connections in one or more of a plurality of selectable media is an enhanced service provided by subsystem 11 to workstations 37–39. Workstations 37 and 39 are now participants in a bidirectional, and possibly a multi-media, call.

Returning to step 504, PPS 332 receives the acceptance indication that was forwarded by EP_A 370, and updates its transaction record accordingly, at step 506. PPS 332 also forwards the acceptance indication to PFS 131 via an EVENT_NOTIFICATION (CONNECT) message, at step 508. PFS 131 receives the message and updates its transaction record accordingly, at step 510. PFS 131 also indicates the acceptance to PCP 132, at step 512. PCP 132 receives the acceptance indication and updates the status of workstations 37 and 39 accordingly, at step 514, by making appropriate changes to the contents of entries 134 in PST 133 for EP_A and EP_C, as indicated at step 516. PBX 13 now has a standard call record for the call between EP_A, EP_C, and phantom MMUSR. This is another service that PBX 13 provides for subsystem 11: it keeps track of the present status of workstations 37–39, including the status of any calls that they are participating in.

Figure 6:
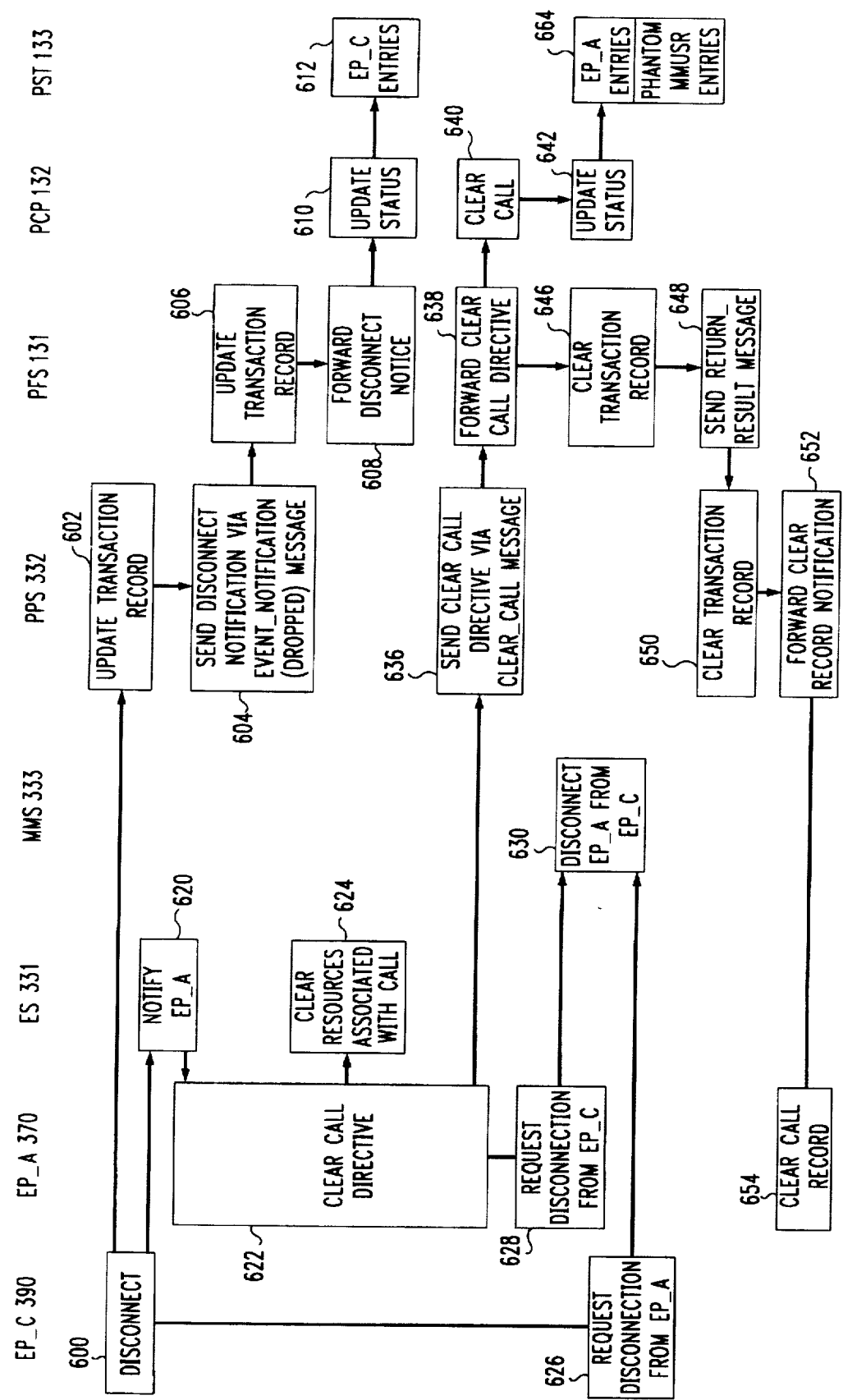
FIG. 6 is a flow diagram of functions performed by the control processes of FIG. 2 to terminate the call of FIGS. 3–5.

FIG. 6 illustrates the scenario for termination of the call between workstations 37 and 39 whose establishment was illustrated in FIGS. 3–5. Assume that workstation 39 (EP_C 390) is the first to disconnect from the call. EP_C 390 notifies both ES 331 and PPS 332 of the disconnection, at step 600, and requests MMS 333 to disconnect it from EP_A, at step 626. PPS 332 updates its transaction record accordingly, at step 602. PPS 332 also sends the disconnect indication to PFS 131 via an EVENT_NOTIFICATION (DROPPED) message, at step 604. PFS 131 also forwards the disconnect notice to PCP 132, at step 608. In response, PCP 132 updates the status of EP_C, at step 610, by modifying its entries 134 in PST 133, as indicated at step 612. Even though the call is now only a single-party call, because of the involvement of phantom terminal MMUSR in the call, PBX 13 continues to see the call as (at least) a two-party call, and hence it maintains the call.

Returning to step 600, when ES 331 receives the notification of disconnection from EP_C 390, it in turn notifies EP_A 370, at step 620. EP_A 370 normally responds with a clear-call directive, at step 622, which it sends to ES 331 and PPS 332. EP_A 370 also requests MMS 333 to disconnect it from EP_C, at step 628. MMS 333 responds to the disconnect requests from EP_C 390 and EP_A 370 by disconnecting EP_A and EP_C as requested, at step 630.

When ES 331 receives the clear-call directive given at step 622, it responds by clearing any resources which it is managing that were implicated in the call, at step 624. When PPS 332 receives the clear-call directive, it forwards the directive to PFS 131 via a CLEAR_CALL message, at step 636. PFS 131 responds by forwarding the clear-call directive to PCP 132, at step 638. PCP 132 views the clear-call directive as EP_A dropping from the call, which leaves only the single, phantom, party MMUSR on the call. PCP 132 therefore clears the call in a conventional manner, at step 640, and updates the status of endpoints that were involved in the call accordingly, at step 642. This involves updates to entries 134 of EP_A and phantom MMUSR in PST 133, as indicated at step 644.

Further in response to the clear-call directive, PFS 131 clears its transaction record for the call, at step 646, and notifies PPS 331 via a RETURN_RESULT message, at step 648. PPS 332 receives the message and clears its transaction record for the call, at step 650. PPS 332 also forwards notification thereof to EP_A 370, at step 652. EP_A 370 receives the notification and in turn clears its call record for the call, at step 654.

Figure 7:
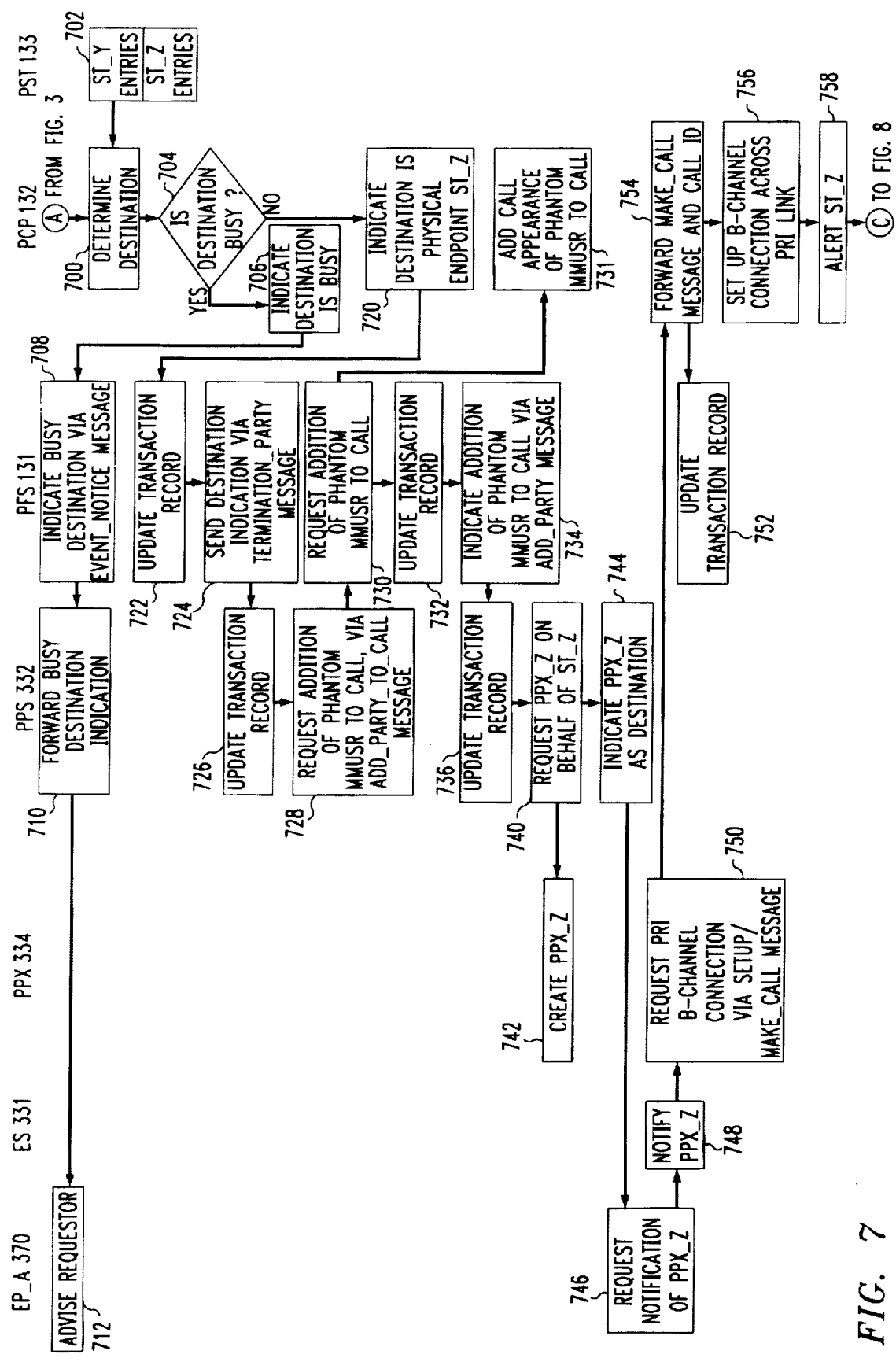
Figure 8:
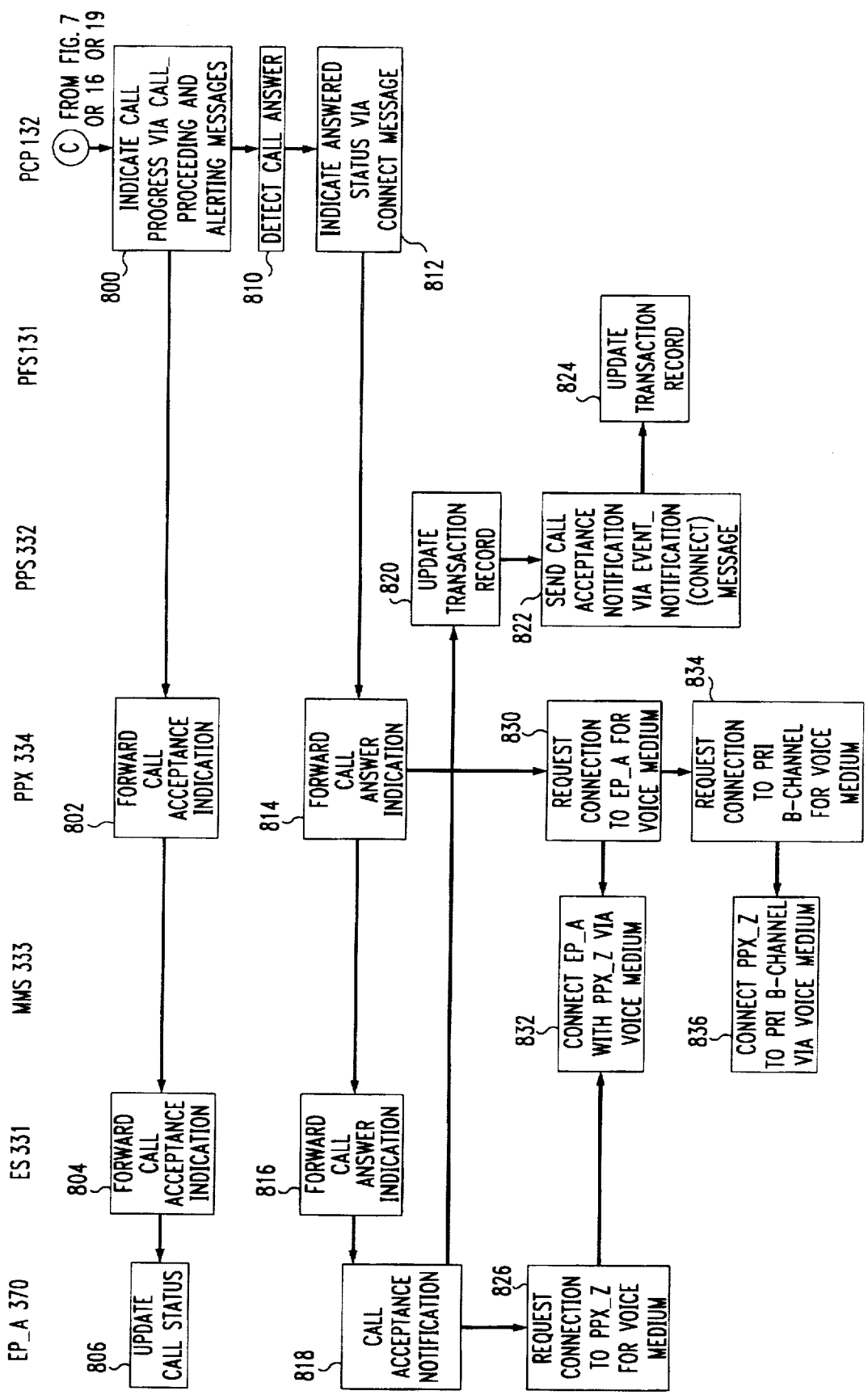

FIGS. 3 and 7–8 illustrate a scenario for call establishment between one of the workstations 37–39 and one of the telephone sets 18–19, wherein the call is originated by the workstation. Assuming that workstation 37 originates a call to telephone set 18 (ST_Y), references to ST_Y replace references to EP_B in FIG. 3. If, for example, telephone set 18 subscribes to a send-all-calls feature which is activated and which designates workstation 39 (EP_C) as the covering endpoint, the scenario would correspond to that shown in FIGS. 3–5 discussed above. However, assume instead that telephone set 18 subscribes to the send-all-calls feature which is activated and which designates telephone set 19 (ST_Z) as the covering endpoint.

Continuing with this latter scenario, PCP 132 determines, at step 700 of FIG. 7, from contents of entries 134 of ST_Y and ST_Z of PST 133, as indicated at step 702, that the call destination is the physical (as opposed to virtual) telephone set 19 (ST_Z). PCP 132 also determines from those entries 134 whether the destination is busy, at step 704. If ST_Z is busy, PCP 132 initiates the scenario of steps 706–712 which re-creates the scenario of steps 406–412, respectively, of FIG. 4. If ST_Z is not busy, PCP 132 notifies PFS 131 of the destination, at step 720. In response, PCP 132 and PFS 131 initiate the scenario of steps 722–736 which re-creates the scenario of steps 422–446, respectively, of FIG. 4. In response to the destination information that it received at step 726, PPS 332 requests PPX 334 to create an instance of itself, called PPX_Z, on behalf of telephone set 19 (ST_Z), at step 740. PPX 334 responds by creating a new instance of itself named PPX_Z, at step 742. PPS 332 then provides an identifier, e.g., the name, of PPX_Z, to EP_A 370 as the destination of the call, at step 744. EP_A 370 receives the destination identifier and responds by requesting that PPX_Z be notified and requested to participate in the call, at step 746. ES 331 receives the request and notifies PPX_Z, at step 748. PPX_Z receives the notification and makes a request for a bidirectional PRI B-channel connection across PRI link 10 by sending a SETUP message carrying a MAKE_CALL message across PRI link 10 to PCP 132, at step 750. The MAKE_CALL message carries the call identifier that had been assigned to this call by PPS 332 at step 302 of FIG. 3. PCP 132 receives the SETUP message and forwards the MAKE_CALL message contained therein, along with the call identifier that PCP 132 uses for this call, to PFS 131, at step 754. PFS 131 updates its transaction record accordingly by entering both of the received call identifiers in the call's transaction record, at step 752.

In response to the SETUP message that it received at step 754, PCP 132 sets up the requested B-channel connection across PRI link 10, at step 756, in a conventional manner. PCP 132 then alerts telephone set 19 (ST_Z), e.g., by ringing telephone set 19, at step 758. PCP 132 indicates receipt and progress of the call by sending a CALL_PROCEEDING message across PRI link 10 to PPX_Z, and sends the alerting status of telephone set 19 (ST_Z) across PRI link 10 via an ALERTING message, both at step 800 of FIG. 8. PPX_Z receives the CALL_PROCEEDING and ALERTING messages and forwards an indication of call acceptance and alerting to ES 331, at step 802. ES 331 in turn forwards the call-acceptance and alerting indications to EP_A 370, at step 804. EP_A 370 receives the indications and updates its call status accordingly, at step 806.

It is up to workstation 37 to decide how long to wait for telephone set 19 to be answered. If telephone set 19 is not answered within an acceptable period of time, workstation 37 usually clears the call. This portion of the scenario is illustrated in steps 912 et seq. of FIG. 9. If, however, telephone station 19 (ST_Z) answers the call promptly, PCP 132 detects the answer in the conventional manner, at step 810, and indicates the answered status of the call to PPX_Z via a CONNECT message that it sends across PRI link 10, at step 812. In response, PPX_Z requests ES 331 to notify EP_A 370 of the call-answered status, at step 814, and also requests MMS 333 to establish a unidirectional connection from PPX_Z to EP_A 370 for a voice medium, at step 830, and to establish a bidirectional voice connection from PPX_Z to the PRI B-channel, at step 834. ES 331 notifies EP_A 370 of the call-answered status, at step 816. In response, EP_A 370 sends a call-acceptance notification to PPS 332, at step 818. PPS 332 receives the acceptance notification and updates its transaction record accordingly, at step 820. PPS 332 also sends the acceptance notification to PFS 131 via an EVENT_NOTIFICATION (CONNECT) message across PRI link 10, at step 822. PFS 131 receives the message and updates its transaction record accordingly, at step 824.

Having given the call acceptance notification at step 818, EP_A 370 also requests MMS 333 to establish a unidirectional connection to PPX_Z for a voice medium, at step 826. In response to the connection requests received from EP_A 370 and PPX_Z, MMS 333 establishes voice connections between EP_A 370 and PPX_Z, at step 832, and establishes a voice connection between PPX_Z and the PRI B-channel, at step 836. PPX 334 has associated with itself one or more physical locations in a voice-medium switching fabric of switching fabrics 36, and MMS 333 makes the connections on behalf of PPX_Z to one of these physical locations. Workstation 37 and telephone set 19 are now participating in a voice call.

Figure 9:
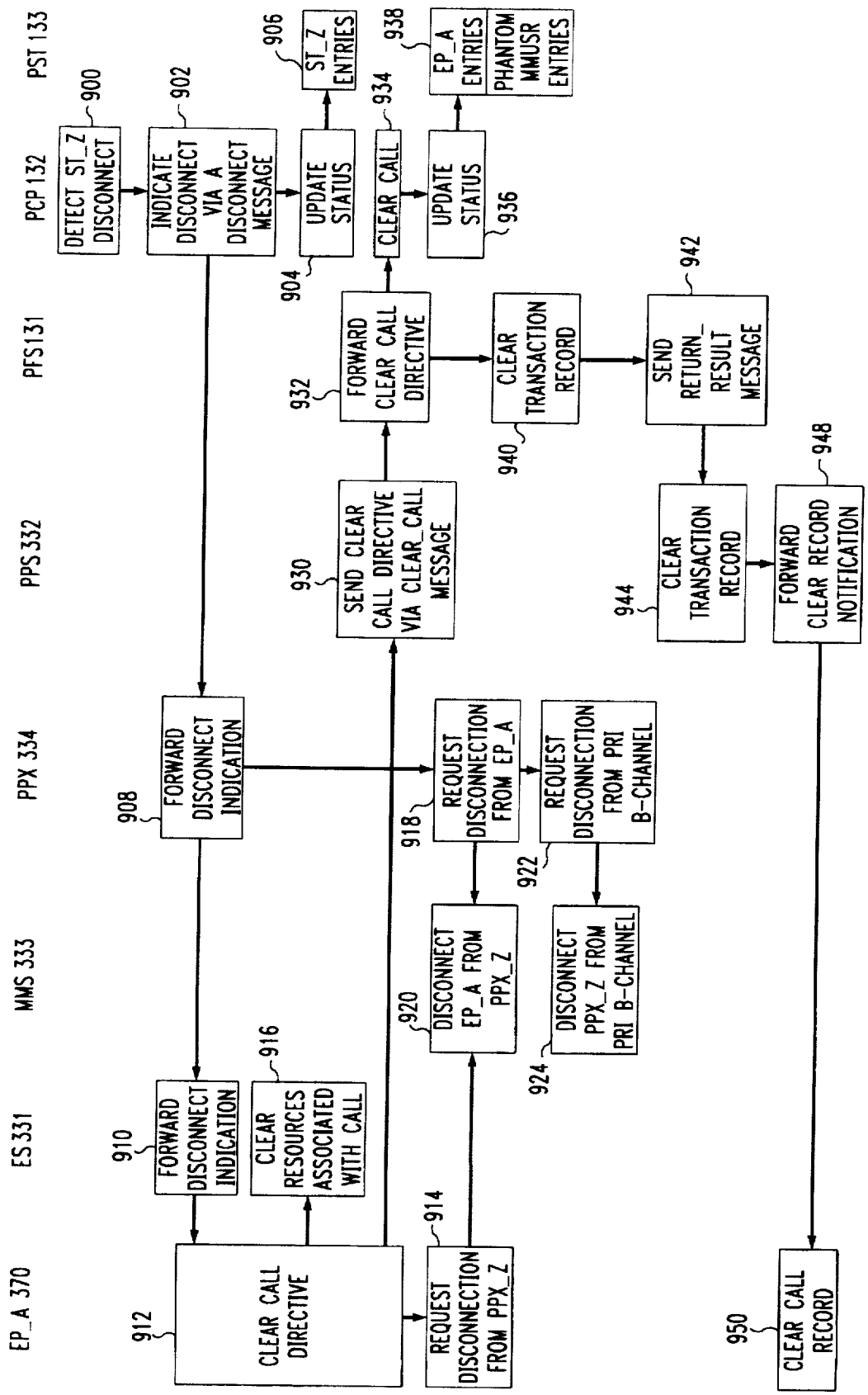
FIG. 9 is a flow diagram of functions performed by the control processes of FIG. 2 to terminate the call of FIGS. 3 and 7–8.
Figure 13:
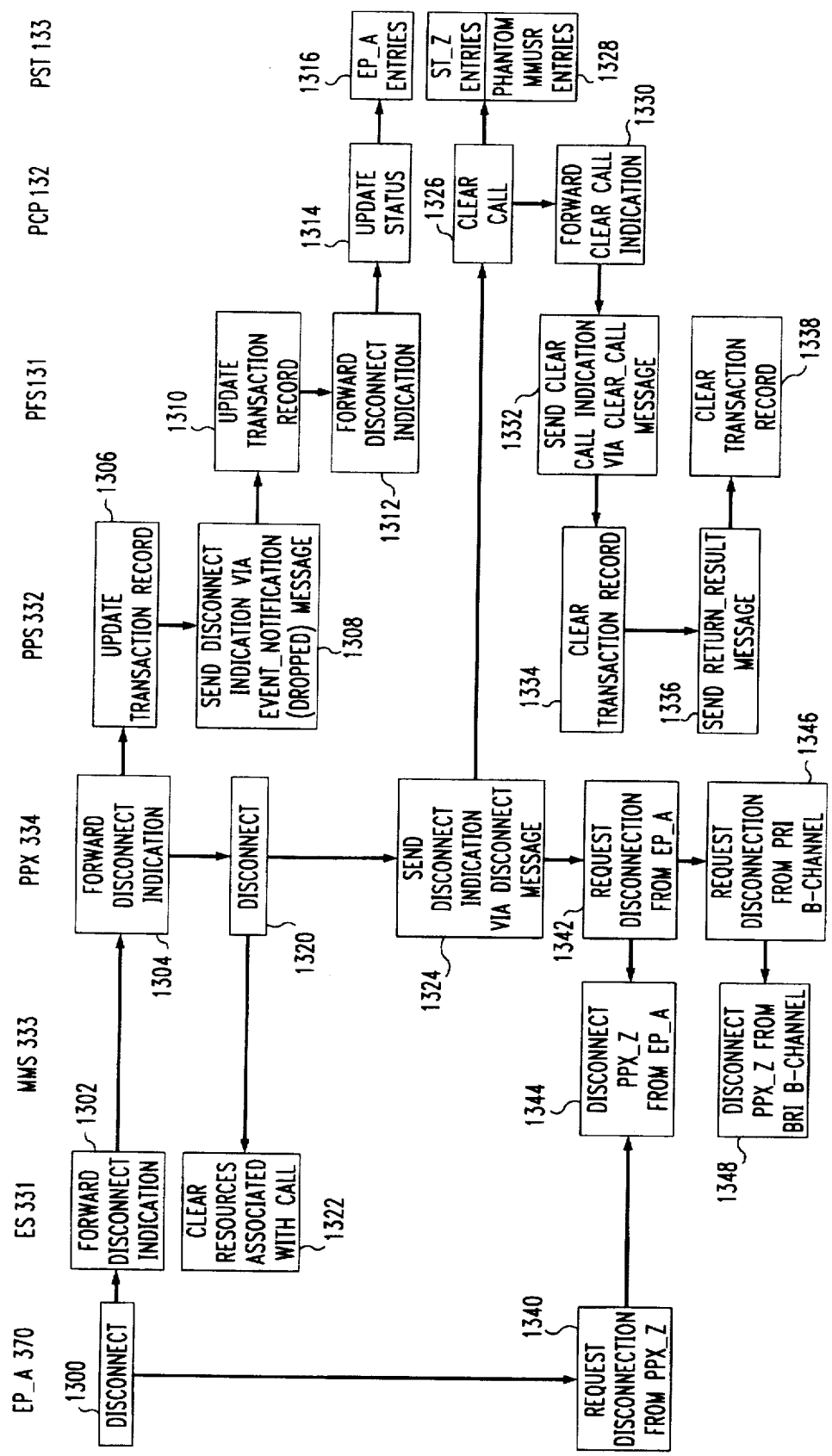
FIG. 13 is a flow diagram of functions performed by the control processes of FIG. 2 to terminate the call of FIGS. 10–12.

FIG. 9 illustrates the scenario for termination of the call between workstation 37 and telephone set 19 whose establishment was illustrated in FIGS. 3 and 7–8. Assume that telephone set 19 is the first to disconnect from the call (disconnection initiated by a workstation is shown in FIG. 13). PCP 132 detects the disconnection in a conventional manner, at step 900. In response, PCP 132 gives an indication of the disconnection by sending a DISCONNECT message over PRI link 10 to PPX_Z, at step 902. PCP 132 also updates the status of endpoints involved in the call, at step 904. This includes changing the status of telephone 19 (ST_Z) in entries 134 of PST 133, as indicated at step 906.

PPX_Z receives the DISCONNECT message from PCP 132 and forwards the disconnect indication to ES 331, at step 908. PPX_Z also requests MMS 333 to disconnect it from workstation 37 (EP_A), at step 918, and to disconnect it from the B-channel of PRI link 10, at step 922. ES 331 forwards the disconnect indication to EP_A 370, at step 910. In response, EP_A 370 issues a clear-call directive to ES 331 and to PPS 332, at step 912. EP_A 370 also requests MMS 333 to disconnect it from PPX_Z, at step 914. In response to the disconnect requests received from EP_A 370 and PPX_Z, MMS 333 disconnects EP_A 370 from PPX_Z 334, at step 920, and disconnects PPX_Z 334 from the B-channel of PRI link 10, at step 924. In response to the clear-call directive, ES 331 clears whatever resources were implicated in the call, at step 916, and PPS 332 sends the directive via a CLEAR_CALL message to PFS 131, at step 930. PFS 131 forwards the clear-call directive to PCP 132, at step 932. In response, PCP 132 clears the call, at step 934, and updates the status of endpoints involved in the call, at step 936. This includes changing the status of EP_A 370 and phantom MMUSR in their entries 134 in PST 133, as indicated at step 938.

Further in response to the received clear-call directive, PFS 131 clears its transaction record for the call, at step 940, and sends a RETURN_RESULT message to PPS 332, at step 942. PPS 332 responds by in turn clearing its transaction record for the call, at step 944. PPS 332 then forwards a clear-call notification to EP_A 370, at step 948. EP_A 370 responds by clearing its call record of the call, at step 950, and the call comes to an end.

Figure 10:
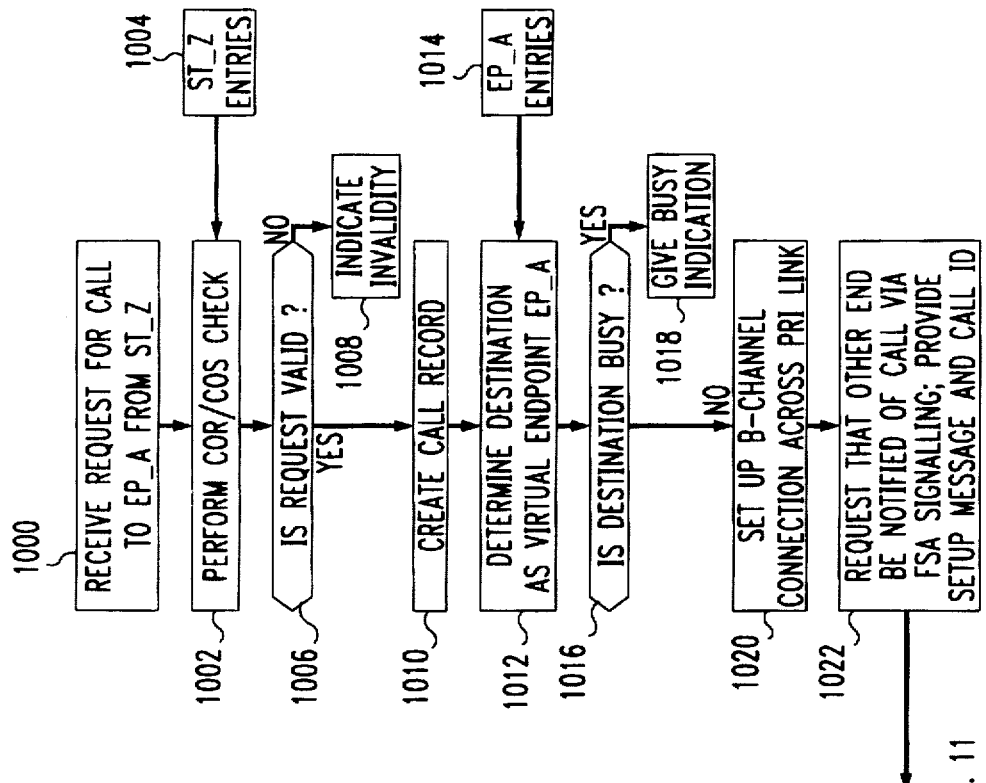
FIGS. 10–12 are a flow diagram of functions performed by the control processes of FIG. 2 to establish a call originated by a telephone set between the telephone set and a workstation in the system of FIG. 1.
Figure 11:
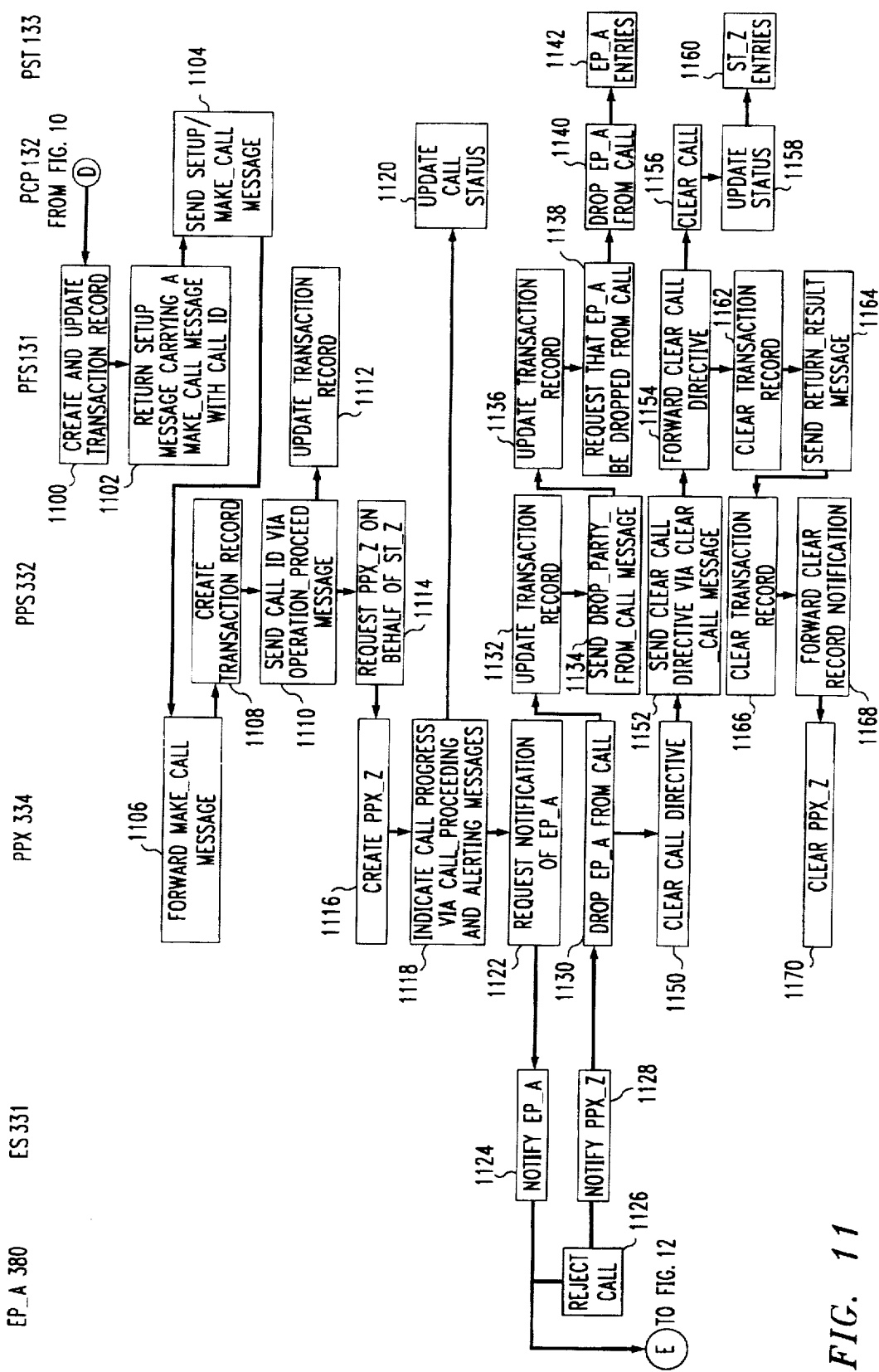
Figure 12:
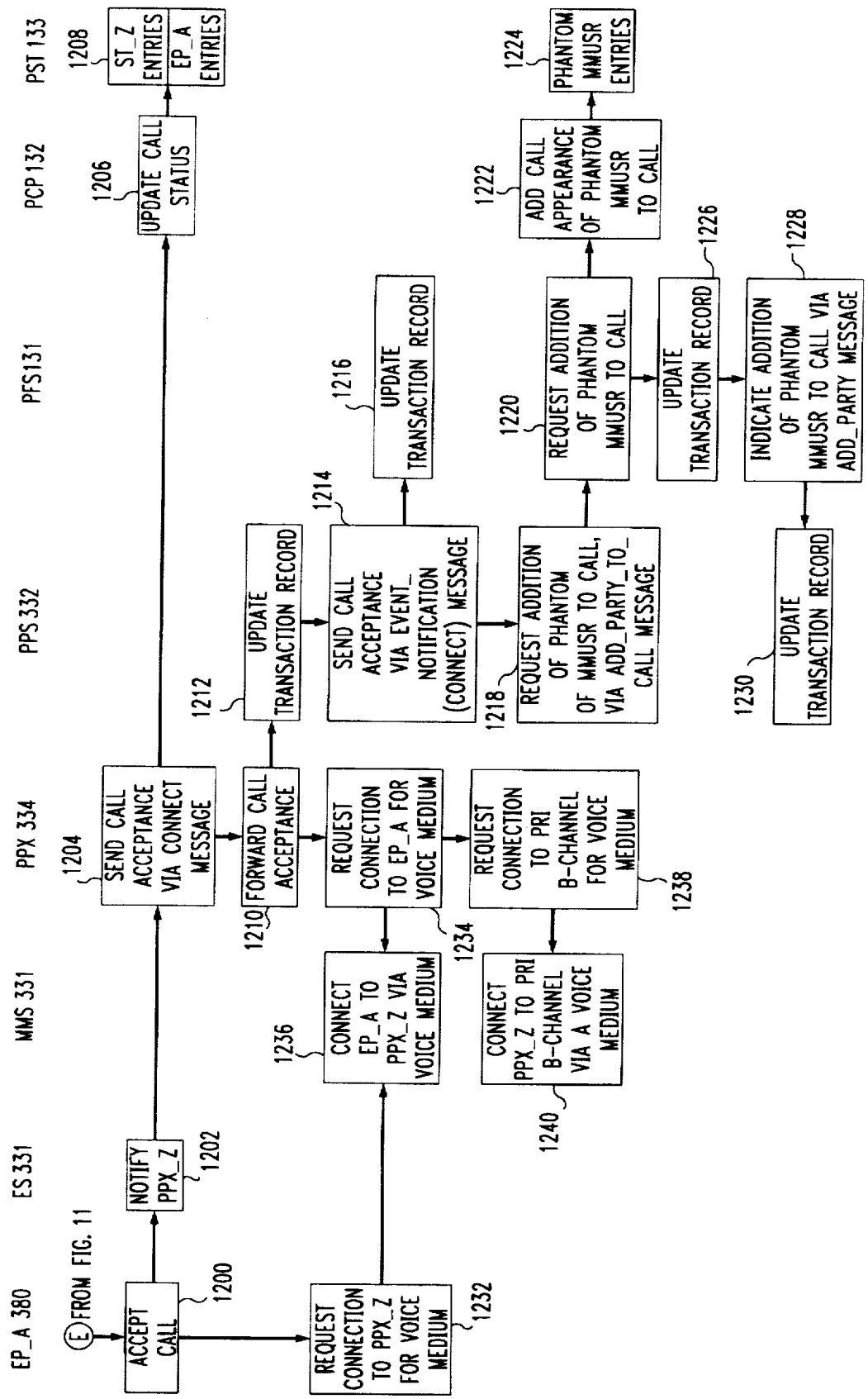

FIGS. 10–12 illustrate a scenario for call establishment between one of the workstations 37–39 and one of the telephone sets 18–19 wherein the call is originated by the telephone set. This call scenario could be the result of either one of the telephone sets 18–19 calling one of the workstations 37–39, or one of the telephone sets 18–19 calling another one of the telephone sets 18–19 but having its call re-directed to one of the workstations 37–39.

Assume that telephone set 19 calls workstation 37 directly. PCP 132 receives a request from telephone set 19 (ST_Z) for a call to workstation 37 (EP_A) in the conventional manner, at step 1000. In response, PCP 132 performs the COR/COS check on the request, at step 1002, by examining entries 134 for telephone set 19 (ST_Z) in PST 133, as indicated at step 1004. If the COR/COS check shows the request to be invalid, as determined at step 1006, PCP 132 indicates invalidity to telephone set 19, at step 1008, and the call comes to an end in the conventional manner. If it is determined at step 1006 that the request is valid, PCP 132 creates a call record for the call, at step 1010, and then determines the destination of the call, at step 1012, from contents of entries 134 of workstation 37 (EP_A) in PST 133, as indicated at step 1014. Assuming that these contents do not change the call destination, PCP 132 determines that the call destination is a virtual endpoint EP_A, and further determines from those contents if the destination is busy, at step 1016. If workstation 37 is indicated in PST 133 to be busy, PCP 132 gives a conventional busy indication to telephone set 19, at step 1018, and the call then comes conventionally to an end. If, however, workstation 37 is not indicated to be busy, PCP 132 sets up a PRI B-channel connection across PRI link 10, at step 1020, in a conventional manner. PCP 132 then requests PFS 131 to notify the other end of PRI link 10 of the existence of the call, and provides PFS 131 with a SETUP message and the call identifier that PCP 132 has assigned to the call, at step 1022. The SETUP message conventionally includes identifiers for the call originating and call terminating endpoints. PFS 131 responds to the request by creating a transaction record for the call, in which it enters the endpoint identifiers and both the received call identifier and a call identifier that it assigns to the call, at step 1100 of FIG. 11. PFS 131 also enters in the SETUP message a MAKE_CALL message which contains a call identifier that PFS 131 has assigned to the call, and returns the SETUP message to PCP 132, at step 1102. PCP 132 sends the SETUP message across PRI link 10 to PPX 334, at step 1104. PPX 334 receives the SETUP message and forwards the MAKE_CALL message contained therein to PPS 332, at step 1106. PPS 332 receives the MAKE_CALL message and creates a transaction record for the call in which it enters both the received call identifier and a call identifier that it assigns to the call, at step 1108. PPS 332 then sends this latter call identifier to PFS 131 via an OPERATION_PROCEED message over PRI link 10, at step 1110. PFS 131 updates its transaction record with the received call identifier, at step 1112.

Further in response to the MAKE_CALL message, PPS 332 requests PPX 334 to create an instance of itself, referred to herein as PPX_Z, on behalf of telephone set 19 (ST_Z), at step 1114. PPX 334 does so, at step 1116. PPX_Z then reports call progress to PCP 132 by sending a CALL_PROCEEDING message and an ALERTING message across PRI link 10, at step 1118. PCP 132 receives these messages and updates its call status accordingly, at step 1120.

Having reported call progress to PCP 132, PPX_Z also requests ES 331 to notify EP_A 370 and offer it the call from ST_Z, at step 1122. ES 331 does so, at step 1124. The notice indicates that the call is to be conducted in the voice medium.

EP_A 370 can either accept or reject the call. If it rejects the call, it so notifies ES 331, at step 1126. ES 331 in turn notifies PPX_Z, at step 1128. In response, PPX_Z issues a directive to drop EP_A from the call, at step 1130. PPS 332 receives the directive and updates its transaction record accordingly, at step 1132. PPS 332 also sends the directive across PRI link 10 via a DROP_PARTY_FROM_CALL message, at step 1134. PFS 131 receives this message and updates its transaction record accordingly, at step 1136. PFS 131 also requests PCP 132 to drop EP_A from the call, at step 1138. PCP 132 receives the request and drops EP_A from the call, at step 1140, updating its call status accordingly, including modifying entries 134 for EP_A in PST 133, as indicated at step 1160.

It is now up to PPX_Z to decide on behalf of telephone set 19 how to proceed further. The normal course of conduct is to terminate the call attempt and clear the call. Accordingly, PPX_Z issues a clear-call directive, at step 1150. PPS 332 receives the directive and sends it across PRI link 10 via a CLEAR_CALL message, at step 1152. PFS 131 receives this message and forwards the clear-call directive to PCP 132, at step 1154. In response, PCP 132 clears the call, at step 1156, and updates the status of its remaining participant—telephone set 19—in PST 133, at step 1158. This involves modifying entries 134 for ST_Z in PST 133, as indicated at step 1160.

Further in response to receiving the clear-call directive, PFS 131 clears its transaction record for the call, at step 1162, and notifies PPS 332 thereof by sending a RETURN_RESULT message across PRI link 10, at step 1164. PPS 332 receives the message and in turn clears its transaction record for the call, at step 1166. PPS 332 also forwards the clear record notification to PPX_Z, at step 1168. PPX_Z receives the notice and clears itself, thereby ceasing its existence, at step 1170.

Returning to step 1124, assuming that EP_A 370 responds to being offered the call from ST_Z by accepting the call, at step 1200 of FIG. 12, ES 331 receives an indication of the acceptance from EP_A 370 and forwards it to PPX_Z, at step 1202. PPX_Z in turn forwards the acceptance indication to PCP 132 by sending a CONNECT message across PRI link 10, at step 1204. PCP 132 receives the message and updates the status of telephone set 19 and workstation 39 accordingly, at step 1206, by making appropriate changes to the contents of entries 134 for ST_Z and EP_A in PST 133, as indicated at step 1208.

In addition to sending the CONNECT message to PCP 132 at step 1204, PPX_Z also forwards notification of the call acceptance to PPS 332, at step 1210. PPS 332 receives the notification and updates its transaction record accordingly, at step 1212. PPS 332 also sends an indication of the acceptance to PFS 131 via an EVENT_NOTIFICATION (CONNECT) message, at step 1214. PFS 131 receives this message and updates its transaction record accordingly, at step 1216. In addition, PPS 332 requests that phantom MMUSR be added as a party to the call, by sending an ADD_PARTY_TO_CALL message to PFS 131, at step 1218. PFS 131 receives this message and request PCP 132 to add phantom MMUSR to the call, at step 1220. PCP 132 complies, at step 1222. This includes modifying entries 134 for phantom MMUSR in PST 133, as indicated at step 1224.

Having requested PCP 132 to add phantom MMUSR to the call at step 1220, PFS 131 updates its transaction record accordingly, at step 1226. PFS 131 also notifies PPS 332 of the addition of phantom MMUSR to the call by sending an ADD_PARTY message across PRI link 10, at step 1228. PPS 332 receives the message and updates its transaction record accordingly, at step 1230.

Returning to step 1200, having accepted the call, EP_A 370 sends a request to MMS 333 to establish a voice connection from EP_A 370 to PPX_Z, at step 1232. Similarly, PPX_Z requests MMS 333 to establish a voice connection from PPX_Z to EP_A 370, at step 1234. PPX_Z further requests MMS 333 to establish a voice connection from PPX_Z to the PRI B-channel that had been set up by PCP 132 at step 1020 of FIG. 10, at step 1238. MMS 333 receives the connection requests from EP_A 370 and PPX_Z and establishes voice connections between EP_A 370 and PPX_Z, at step 1236, and establishes a voice connection between PPX_Z and the PRI B-channel, at step 1240. Workstation 37 and telephone set 19 are now participating in a voice call.

FIG. 13 illustrates the scenario for termination of the call between workstation 37 and telephone set 19 whose establishment was illustrated in FIGS. 10–12. Assume that workstation 37 (EP_A 370) is the first to disconnect from the call (disconnection initiated by a telephone set is shown in FIG. 9). EP_A 370 notifies ES 331 of the disconnection, at step 1300. ES 331 forwards the notification to PPX_Z, at step 1302. PPX_Z in turn forwards the notification to PPS 332, at step 1304. PPS 332 updates its transaction record accordingly, at step 1306. PPS 332 also sends the disconnect notification to PFS 131 via an EVENT_NOTIFICATION (DROPPED) message, at step 1308. PFS 131 receives this message and updates its transaction record accordingly, at step 1310. PFS 131 also forwards the disconnect indication to PCP 132, at step 1312. In response, PCP 132 updates the status for the call, at step 1314, including modifying entries 134 for EP_A in PST 133, as indicated at step 1316.

Returning to step 1304, having received the disconnect indication from EP_A 370, PPX_Z also undertakes to disconnect from the call and notifies ES 331, at step 1320. In response, ES 331 clears any resources that were implicated in the call, at step 1322. PPX_Z also sends an indication of its disconnection from the call to PCP 132 via a DISCONNECT message, at step 1324. PCP 132 receives the message and responds by clearing the call, at step 1326. This includes updating entries 134 for ST_Z and phantom MMUSR in PST 133, as indicated at step 1328. PCP 132 then gives a clear-call indication to PFS 131, at step 1330. PFS 131 responds by forwarding the clear-call indication to PPS 332 via a CLEAR_CALL message, at step 1332. PPS 332 receives the message and clears its transaction record for the call, at step 1334. It notifies PFS 131 thereof by sending a RETURN_RESULT message across PRI link 10, at step 1336. PFS 131 receives the message and responds by in turn clearing its transaction record for the call, at step 1338.

Returning to steps 1300 and 1324, having undertaken to disconnect from the call, EP_A 370 requests MMS 333 to disconnect it from PPX_Z, at step 1340, and PPX_Z requests MMS 333 to disconnect it from EP_A 370, at step 1342, and from the PRI B channel, at step 1346. MMS 333 receives these disconnection requests and responds by disconnecting PPX_Z and EP_A 370 from each other, at step 1344, and disconnecting PPX_Z and the PRI B-channel from each another, at step 1348.

Figure 14:
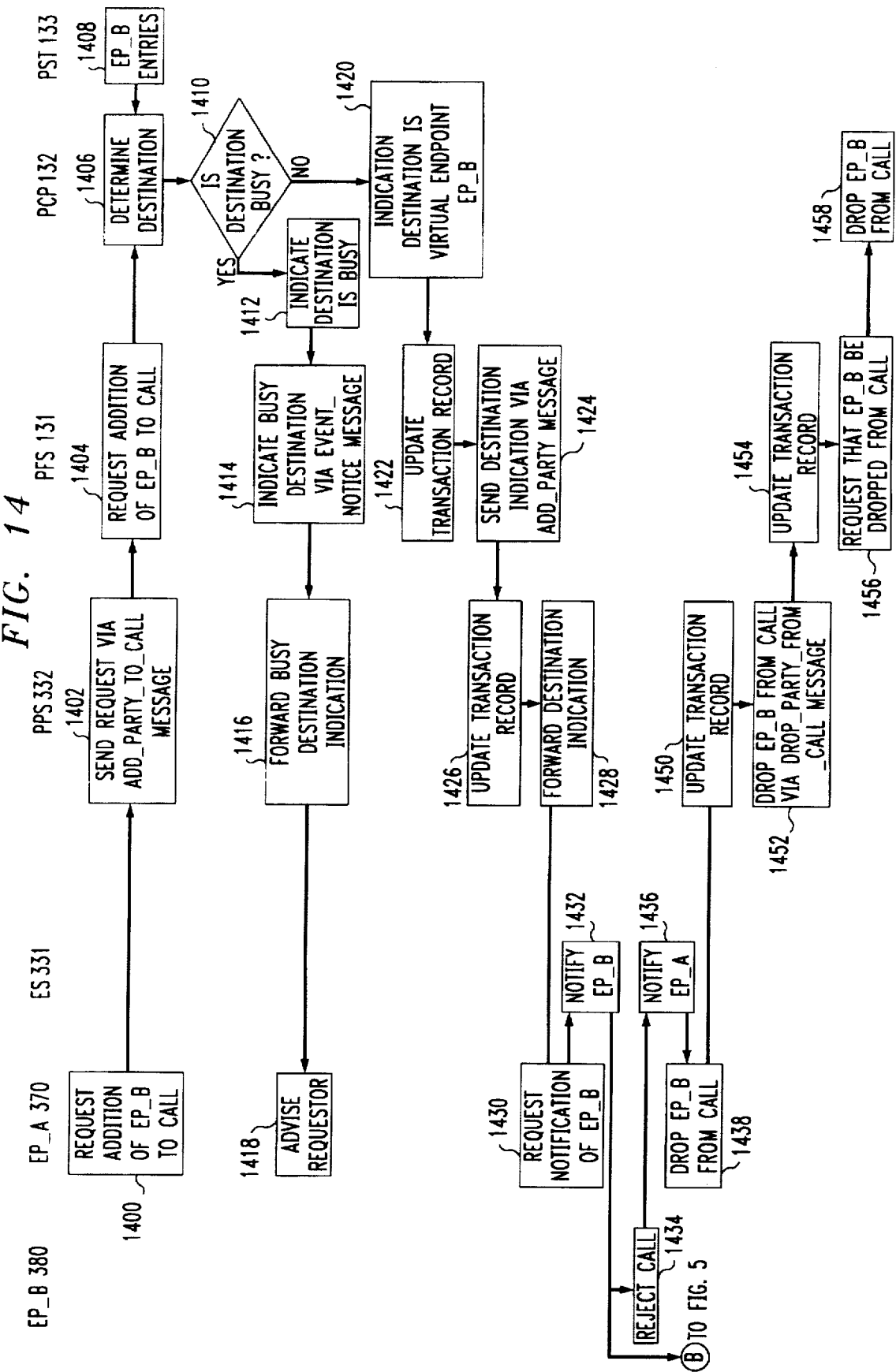

FIGS. 14 and 5 present a first scenario for a conference call. This scenario assumes the existence of a call between workstations—for example, one established according to the scenario of FIGS. 3–5—to which another workstation is being added as a conferee. After establishment of the inter-workstation call, assume that EP_A 370 makes a request to add workstation 38 (EP_B) as a conferee to the call, at step 1400. PPS 332 receives the request and sends it across PRI link 10 via an ADD_PARTY_TO_CALL message, at step 1402. PFS 131 receives this message and in response requests addition of EP_B to the call, at step 1404. PCP 132 receives this request and determines—assuming no redirection—that the additional destination for the call is workstation 38, which is a virtual endpoint from the perspective of PBX 13, at step 1406, from contents of entries 134 for workstation 38 (EP_B) in PST 133, as indicated at step 1408. It also determines whether or not workstation 38 is busy, at step 1410. If workstation 38 is busy, the scenario proceeds at steps 1412–1418 which duplicate the steps 406–412 of FIG. 4, discussed above. If EP_B is not busy, PCP 132 notifies PFS 131 of the destination, at step 1420. PFS 131 receives the destination indication and updates its transaction record accordingly, at step 1422. PFS 131 also sends the destination indication across PRI link 10 via an ADD_PARTY message, at step 1424. PPS 332 receives the message and updates its transaction record for the call accordingly, at step 1426. The scenario then proceeds at steps 1428 et seq. which duplicate the steps 448 et seq. of FIGS. 4 and 5, discussed above, with all references to EP_C 390 and workstation 39 in FIGS. 4 and 5 being replaced by references to EP_B 380 and workstation 38.

Figure 15:
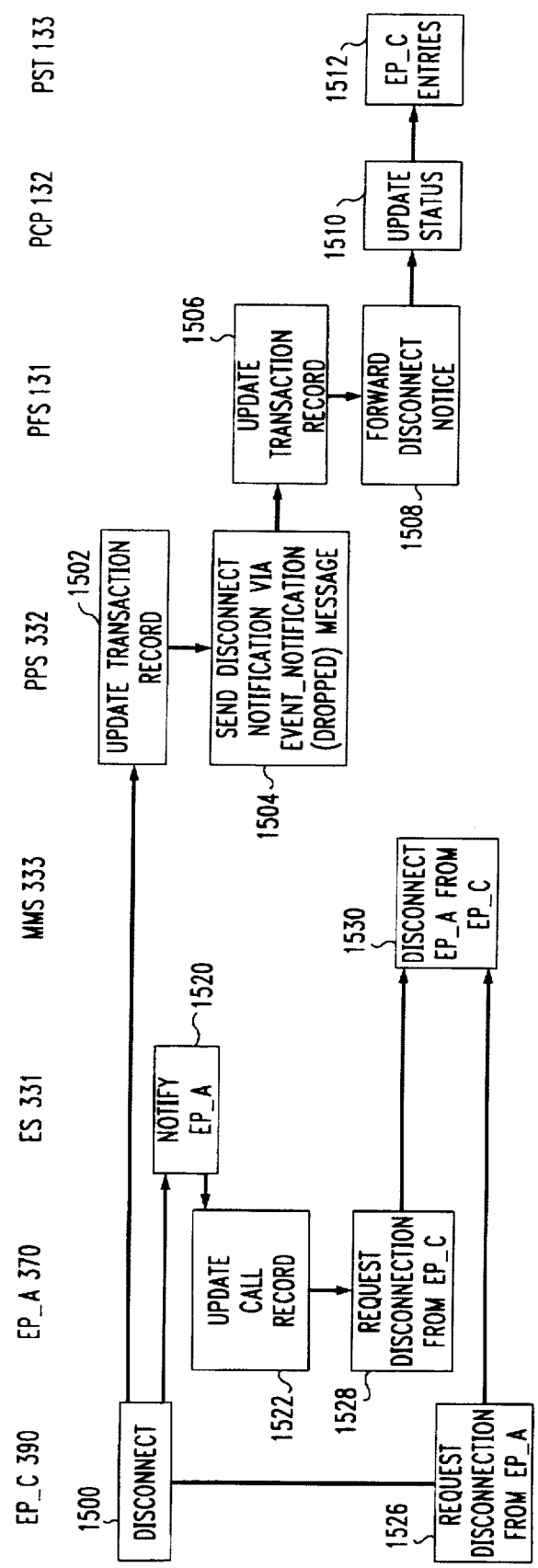
FIG. 15 is a flow diagram of functions performed by the control processes of FIG. 2 to remove a workstation from the conference call of FIGS. 14 and 5.

FIG. 15 shows the disconnect scenario for any but the last two workstations involved in the conference call illustrated in FIG. 14. (The disconnect scenario for the last two workstations is shown in FIG. 6). In FIG. 15, steps 1500–1520 and 1526–1530 duplicate the steps 600–620 and 626–630, respectively, of FIG. 6. In response to being notified of the disconnection of workstation 39 (EP_C) from the call, EP_A 380 does not issue a clear-call directive, but merely updates its call record, at step 1522.

Figure 16:
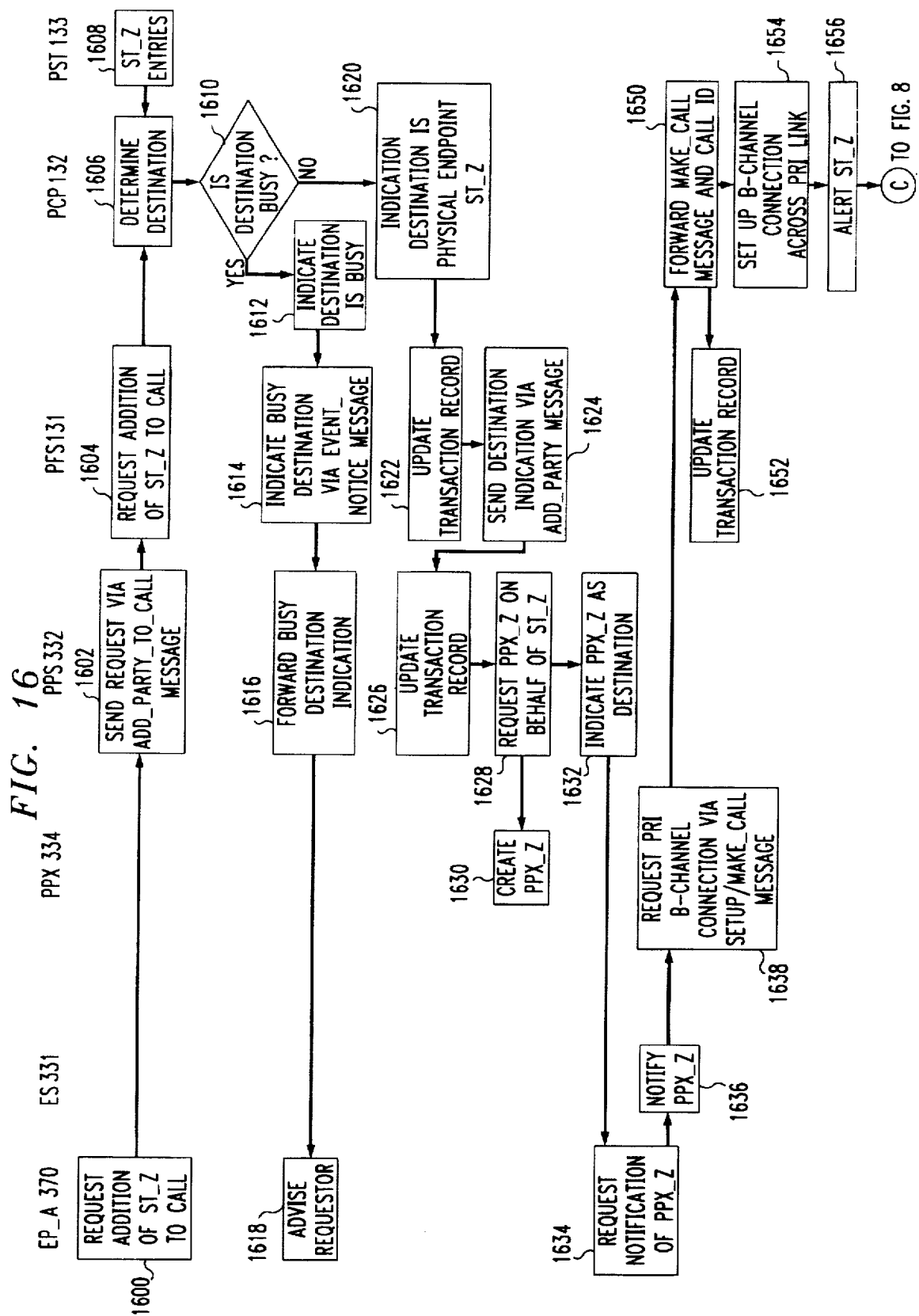

FIGS. 16 and 8 present a second scenario for a conference call. This scenario assumes the existence of a call between workstations—for example, one established according to the scenario of either FIGS. 3–5 or FIGS. 14 and 5—or between a workstation and a first telephone set—for example, one established according to the scenario of either FIGS. 3 and 7–8 or FIGS. 10–12—to which a telephone set 19 is being added as a conferee. After establishment of the inter-workstation call, assume that EP_A 370 make a request to add telephone set 19 (ST_Z) as a conferee to the call, at step 1600. PPS 332 receives the request and sends it across PRI link 10 via an ADD_PARTY_TO_CALL message, at step 1602. PFS 131 receives this message and in response requests addition of ST_Z to the call, at step 1604. PCP 132 receives this request and determines—assuming no redirection—that the additional destination for the call is telephone set 19, which is a physical endpoint, at step 1606, from contents of entries 134 for telephone set 19 (ST_Z) in PST 133, as indicated at step 1608. It also determines whether or not ST_Z is busy, at step 1610. If ST_Z is busy, the scenario proceeds at steps 1612–1618 which duplicate the steps 706–712 of FIG. 7, discussed above. If ST_Z is not busy, PCP 132 notifies PFS 131 of the destination, at step 1620. PFS 131 receives the destination indication and updates its transaction record accordingly, at step 1622. PFS 131 also sends the destination indication across PRI link 10 via an ADD_PARTY message, at step 1624. PPS 332 receives the message and updates its transaction record for the call accordingly, at step 1626. The scenario then proceeds at steps 1628 et seq. which duplicate the steps 740 et seq. of FIGS. 7 and 8, discussed above. In the case of a second telephone set being added as a conferee to a call between a workstation and a first telephone set, this will result in two PRI B-channel connections being involved in the conference call.

Figure 17:
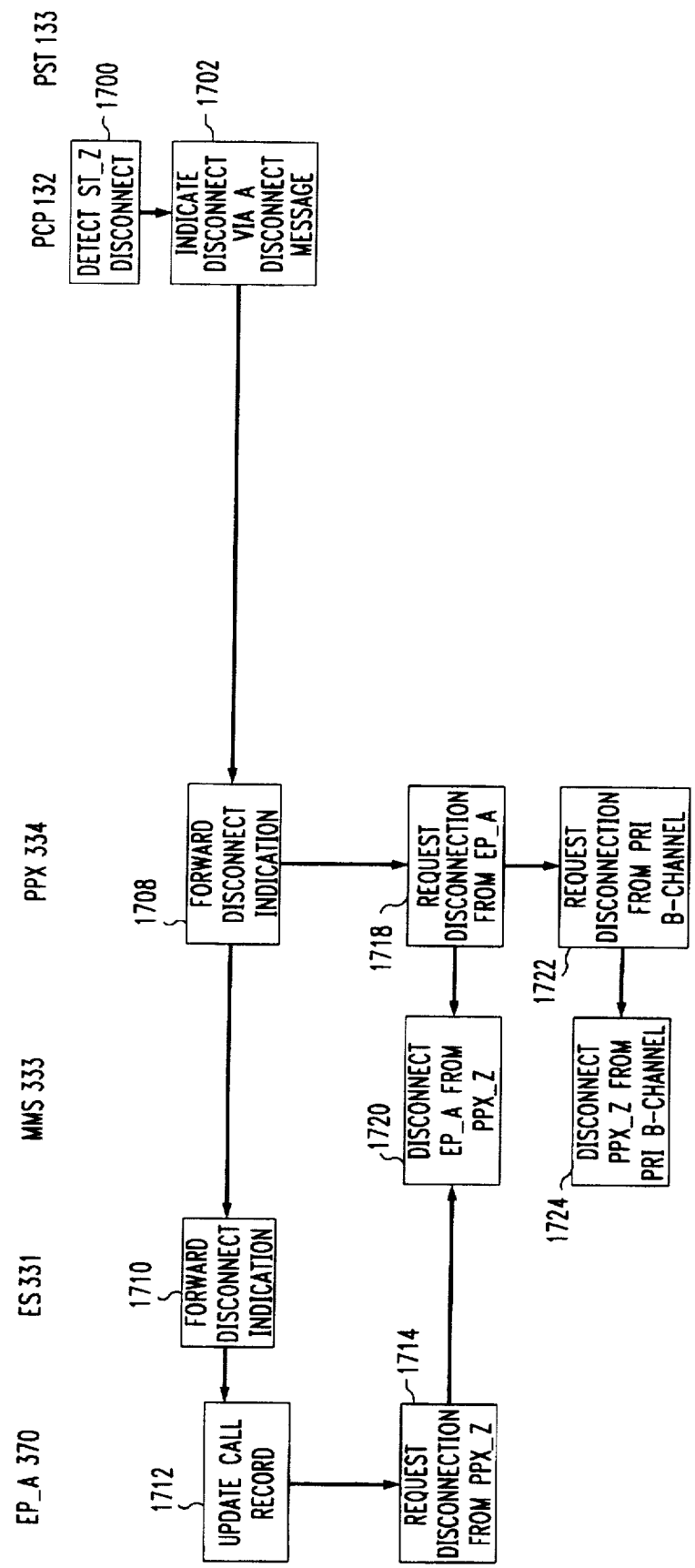
FIG. 17 is a flow diagram of functions performed by the control processes of FIG. 2 to remove a telephone set from the conference call of FIGS. 16 and 8.

The disconnect scenarios for the conference call illustrated in FIG. 16 depend on who disconnects when. If a workstation disconnects while at least two other non-phantom endpoints are engaged in the call, the disconnect scenario for the workstation is the scenario of FIG. 15. If a telephone set disconnects while at least two other non-phantom endpoints are engaged in the call, the disconnect scenario for the telephone is that of FIG. 17. In FIG. 17, steps 1700–1710 and 1714–1724 duplicate the steps 900–910 and 914–1924, respectively, of FIG. 9. In response to being notified of the disconnection of telephone set 19 (ST_Z) from the call, EP_A 370 does not issue a clear-call directive, but merely updates its call record, at step 1712.

For a conference call wherein a workstation 37–39 is being added to an existing call between telephone sets 18–19, the scenario is identical to that for setting up a call initiated by a telephone set to a workstation, illustrated in FIGS. 10–12. The disconnect scenarios for this conference call also depend on who disconnects when, as in the case of the conference call illustrated in FIG. 16.

For a conference call wherein a first telephone set conferences in a second telephone set to a call involving the first telephone set and a workstation, the scenario is the conventional conferencing scenario for endpoints served by a PBX 13; there is no involvement of subsystem 11 in setting up the conference. The disconnect scenarios are the same as for the conference call illustrated in FIG. 16.

For a conference call wherein a first workstation conferences in a second workstation to a call involving the first workstation and a telephone set, the scenario is the one illustrated in FIGS. 14 and 5. The disconnect scenarios are the same as for the conference call illustrated in FIG. 16.

Figure 18:
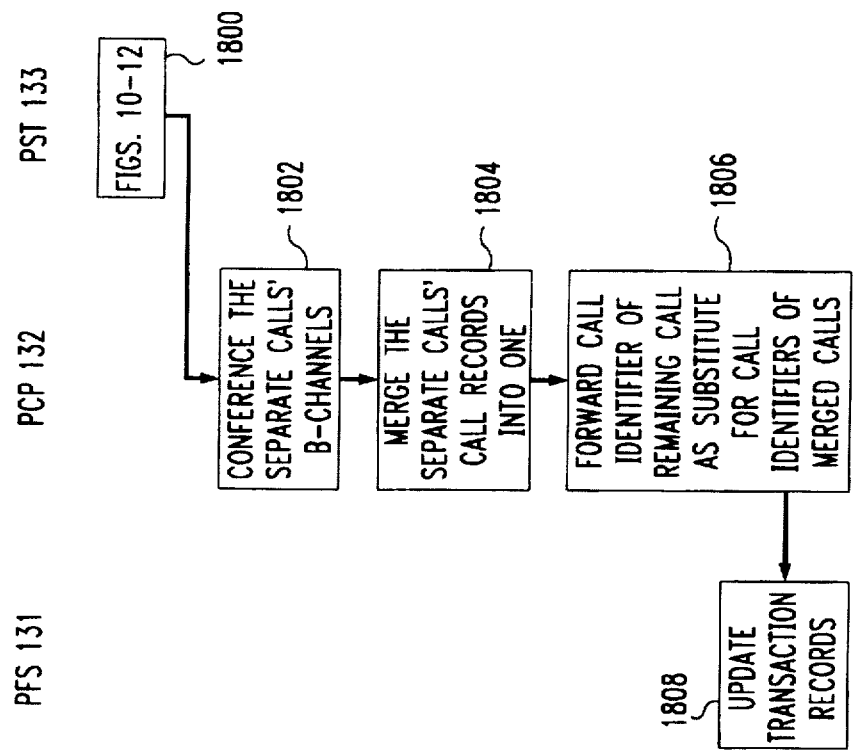
FIG. 18 is a flow diagram of functions performed by the control processes of FIG. 2 to add a telephone set as a conferee to a call between a workstation and a telephone set at the telephone set's request.

For a conference call wherein a telephone set conferences in a second workstation to a call involving the telephone set and a first workstation, one scenario treats the addition of the second workstation as setting up a separate call between the telephone set and the second workstation, as illustrated in FIGS. 10–12, followed by the steps shown in FIG. 18. After the separate calls have been established according to the scenario of FIGS. 10–12, at step 1800, PCP 132 conferences the calls' B channels, at step 1802, in a conventional manner by means of a conference bridge that constitutes a part of the PBX switching fabric 16. PCP 132 also merges the separate call's call records into one, at step 1804, and forwards to PFS 131 the call identifier of the call whose call record remains, as a substitute for the call identifiers of the call or calls whose call records were merged out, at step 1806. PFS 131 updates its transaction records accordingly, at step 1808, resulting in more than one PFS transaction record corresponding to the remaining one (conference) call.

An alternative scenario eliminates the use of multiple B channels for the conference call by eliminating step 1020 in FIG. 10 when the second workstation is being added, and instead having PCP 132 reuse the B channel that was set up for the initial call between the telephone set and the workstation. However, this saving is accomplished at the price of requiring a modification to the conventional PCP 132 that causes it to recognize and handle this type of conference calls differently from conventional calls. The like alternative, with the like penalty, may be used to avoid the use of two B channels for a conference call involving two telephone sets and a workstation, shown in FIG. 16.

The disconnect scenarios are the same as for the conference call illustrated in FIG. 16.

Figure 19:
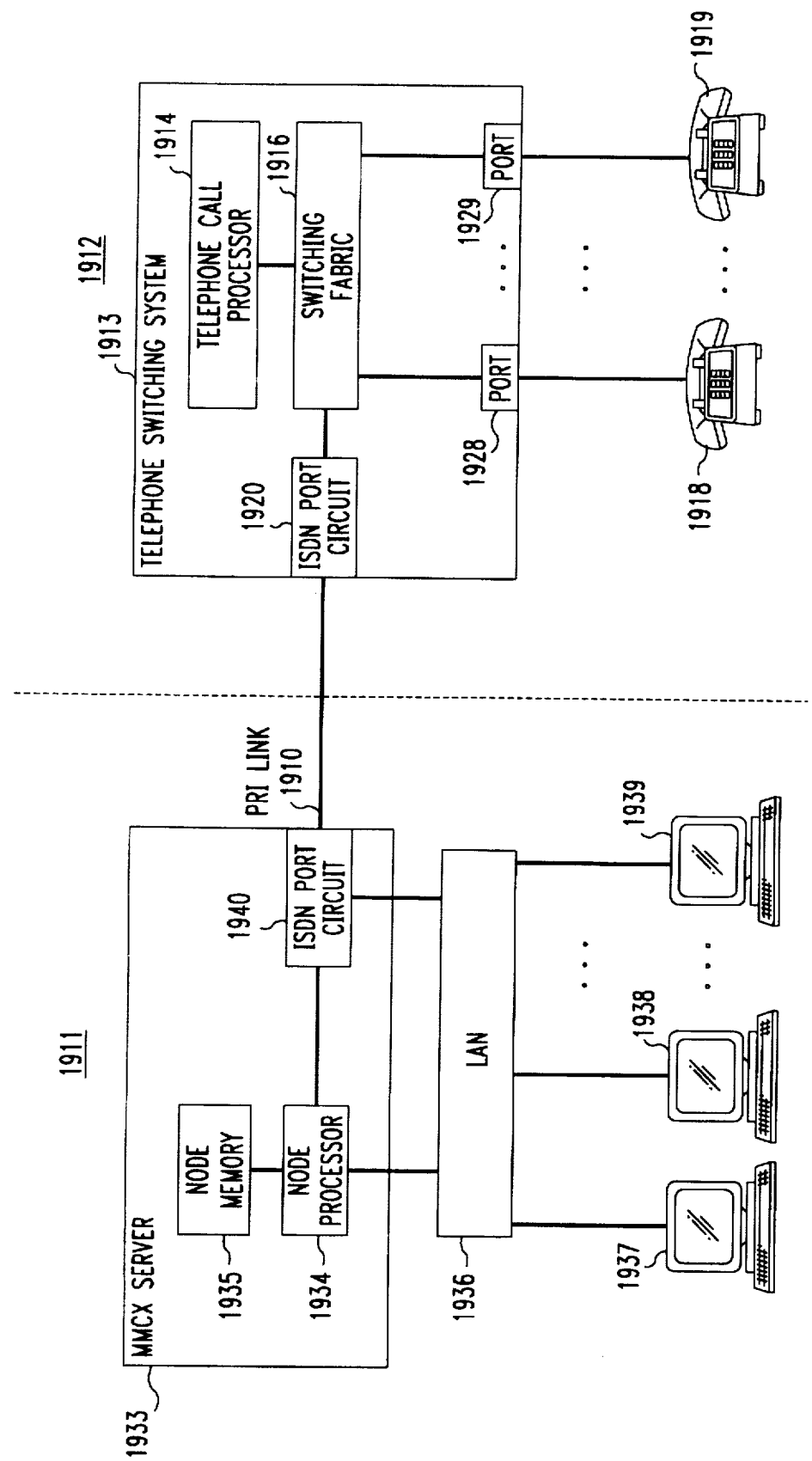
FIG. 19 is a block diagram of another illustrative telecommunications system that embodies a second example of the invention.

FIG. 19 shows a second illustrative telecommunications system that embodies another example of the invention. The system of FIG. 19 is made up of two communications subsystems 1911 and 1912 that are interconnected by a communications link 1910. Only two subsystems are shown for simplicity; a plurality of different subsystems 1912 may be connected to subsystem 1911. Subsystem 1912 illustratively comprises a public or a private telephone network. It includes a telephone switching system 1913, such as a local central office or a private branch exchange (PBX) that provides basic (e.g., telephony voice) communications connections via a switching fabric 1916 under control of a telephone call processor 1914 between a plurality of telephony ports 1920, 1928–1929 in a conventional manner.

Subsystem 1911 illustratively comprises a multimedia client-server system. It includes a multimedia server, which in this illustrative embodiment is a Lucent Technologies Inc. MMCX multimedia communications exchange server 1933. Server 1933 serves a plurality of endpoints 1937–1939, such as user multimedia workstations, which are clients of server 1933. Server 1933 and endpoints 1937–1939 are illustratively interconnected by a local area network (LAN) 1936. Server 1933 is a stored-program-controlled machine that includes a node processor 1934 that executes communications service programs out of a node memory 1935 to effect communications connections for various media between endpoints 1937–1939.

A communications link that interconnects subsystems 1911 and 1912 is illustratively an ISDN primary-rate interface (PRI) link 1910 that terminates at telephone switching system 1913 in a conventional ISDN port circuit 1920.

Though only one PRI link 1910 is shown, a plurality may be used for greater inter-subsystem communications capacity. PRI link 1910 terminates at server 1933 in a conventional ISDN port circuit 1940.

Figure 20:
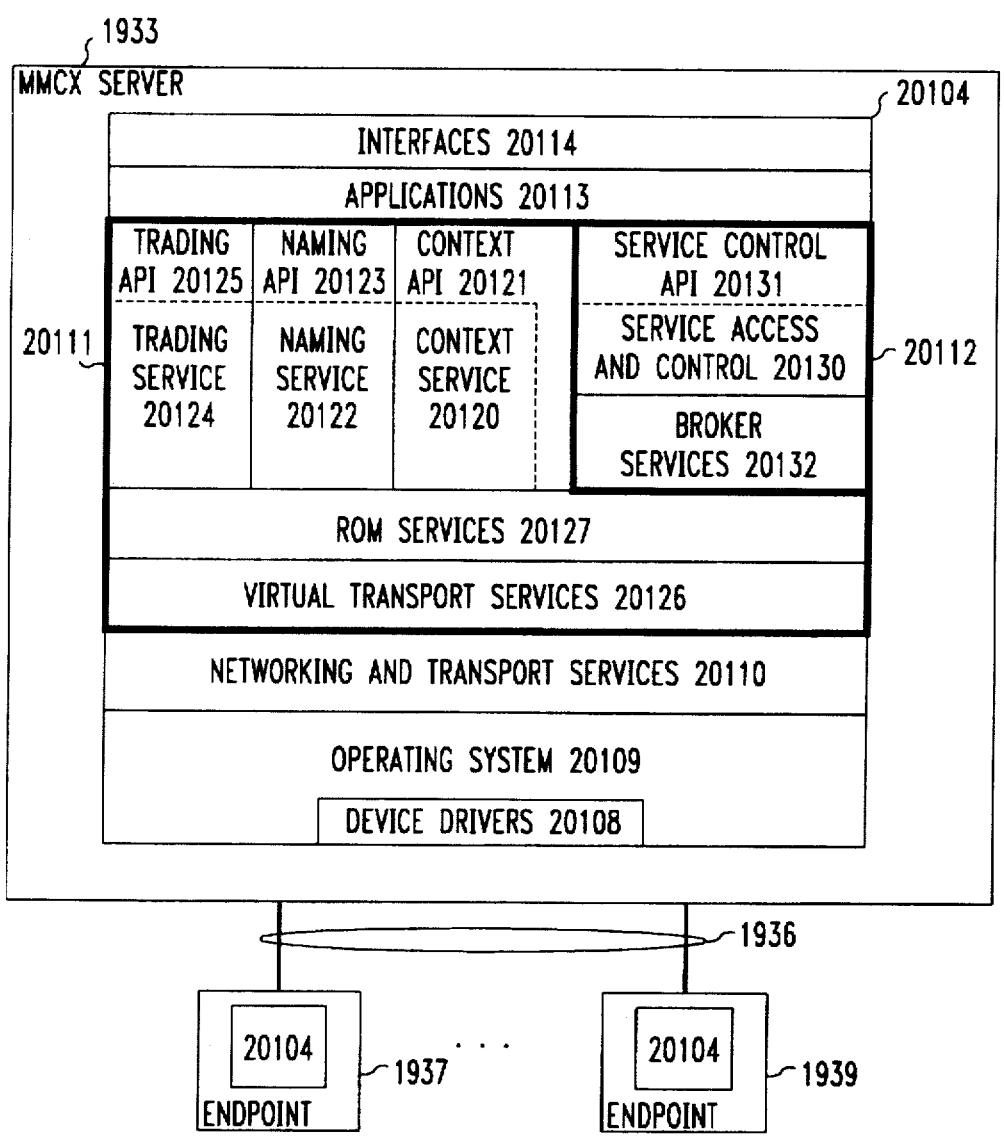
FIG. 20 is a block diagram of relevant control processes and data structures of the system of FIG. 19.

FIG. 20 shows the software architecture of multimedia client-server system 1911. According to well-known software-system design principles, the control software 20104 of server 1933 and endpoints 1937–1939 is organized in a multi-layer hierarchy. At the lowest level in the software hierarchy, the control software of server 1933 and endpoints 1937–1939 in this illustrative example comprises a conventional operating system 20109—such as the Lynx® operating system—that includes conventional device drivers 20108. Next in the hierarchy is a conventional networking and transport services layer 20110—such as the Transmission Control Protocol/Internet Protocol (TCP/IP)—which provides the information-movement (i.e., control-signal and information-signal transmission) services between server 1933 and endpoints 1937–1939. Built on top of layer 20110 is a middleware layer 20111. Middleware is a term for a software platform that provides network-transparent support for the development and implementation of network-based distributed-system applications (e.g., communications services). It is both an applications-development tool and a run-time environment. It provides a distributed object-based computing infrastructure including distributed object lifecycle management, network abstraction, and operating-system and transport-service virtualization. It therefore allows communications applications to be written independently of the resident operating system, the network transport, the interworking algorithms, etc. It also supports a middleware services layer 20112 which provides common services that support various communications applications, such as services for session management, routing, event collection, service location, etc. Implemented on top of layers 20111 and 20112 are applications 20113, e.g., specific communications services programs. Applications 20113 communicate with layers 20111 and 20112 by means of application program interfaces (APIs) of layers 20111 and 20112, and communicate with users and/or administrators via interfaces defined by an interfaces layer 20114. In the case of endpoints 1937–1939, applications 20113 illustratively comprise a version of Insoft's Communique!™ collaboration software.

Layers 20111 and 20112 in this illustrative embodiment comprise the communications middleware software of the Lucent Technologies Inc. MMCX, heretofore known as CoMMware. Layer 20111 comprises the middleware platform, while layer 20112 comprises middleware-compliant service components that make use of the middleware platform primitives to control calls and their different-media components and to supply calling features (like call-coverage and call-forwarding, for example.) The service components include service managers (servers) and service agents (clients).

The middleware platform provides an infrastructure for bringing parties and multimedia services into communications "contexts" which provide bases for negotiation of service parameters. Each communications session (e.g., a multimedia call) is represented by its own context. The architecture provides support for customizable service negotiation and control software, called "policies", that allows application and service developers to meet a wide variety of product-and service-specific needs.

In the model of communications that is presented by the middleware, all communications take place within a context, and parties and services are associated with one another as members within the context by a context service. The context service is somewhat analogous to Microsoft Corporation's Windows™ system. Just as the Windows system distributes events that reflect a change in the applications' presentation environment to all applications running in that environment, so does the context service distribute events which reflect a change in the communications context to all members of that context. In addition to the event-notification mechanism, the context service also supports message-passing among context members, for example, to enable negotiation of interworking parameters between endpoints and servers with possibly-disparate capabilities.

The middleware effectively provides a signaling overlay on top of the underlying network architecture, which overlay supports multiparty, end-to-end negotiation that facilitates the design of interoperable multimedia communications products and services. Middleware concepts of context, virtual transport, and trading aid in the provisioning of multiparty, multimedia distributed communications in heterogeneous environments.

Figure 21:
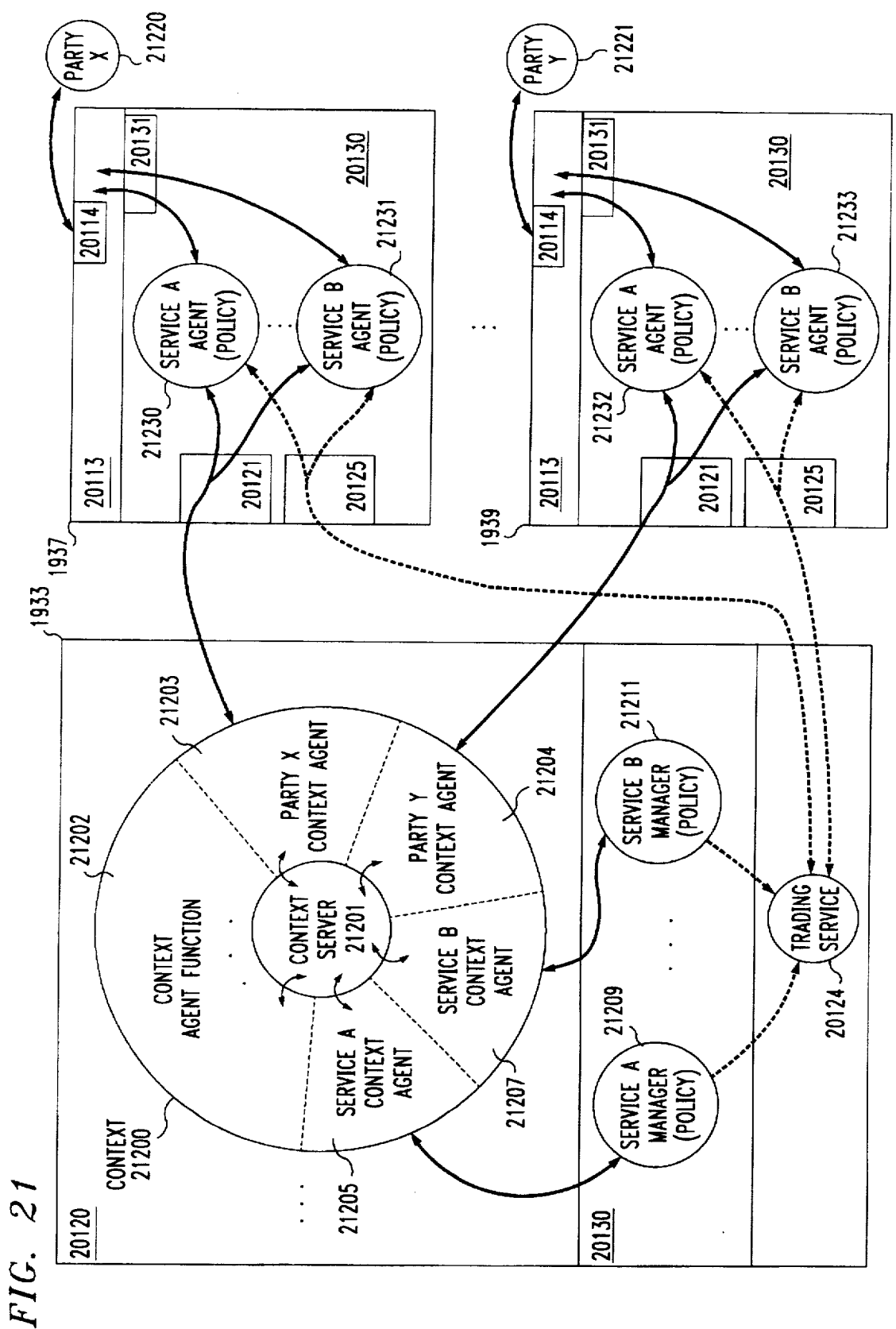
FIG. 21 is a block diagram of a call-service model implemented by the system of FIG. 19.

The model of communications that is presented by the middleware is shown in FIG. 21. The middleware facilitates bringing parties and services together in a "cyberplace", which is referred to as context 21200. A context server 21201 manages context 21200 to/from which may be added/dropped the context members. Members may be parties and services. A logged-in user of an endpoint 1937–1939 who is a member of a context is referred to as a party (21220–21221) to that context. A service is represented in a context 21200 by its service manager 21209–21211. Parties and services are treated identically by context server 21201, and are referred to simply as "members". All members in a context 21200 are represented by a context agent facility 21202. Each member of context 21200 is logically represented in context agent facility 21202 by its own corresponding member context agent 21203–21207 (e.g., its own virtual port on context agent facility 21202). When context 21200 changes as a result of members being added to or dropped from the context, context server 21201 alerts all members' context agents 21203–21207, which in turn notify their corresponding members. When a new member joins an existing context 21200, all members already in the context are similarly notified, and each has a chance to exchange some initial "get acquainted" messages with the new member and with other members that were already in the context. In middleware, this is called "negotiation", since it is generally used to achieve a common ground for communications between the members (parties and services) in the context.

The middleware provides support for brokering in three ways. First, the middleware includes trading service 21124, which is a database system that can be used to locate services based on service characteristics. Services are constructed in a client/server configuration, with programs that actually provide the services, called service managers 21209–21211 (also call services, service components, resource or media servers, or resource or media managers), being located in MMCX server 1933, and programs that obtain the services from service managers 21209–21211 on behalf of applications in endpoints 1937–1939, called service agents 21230–21233 (also called service clients, or resource or media agents), being located in endpoints 1937–1939. Service managers 21209–21211 can register with trading service 21124, giving their service attributes and capabilities. Trading service 21124 provides a query capability to enable service agents 21230–21233 to obtain identities of services (i.e., of service managers 21209–21211) that can meet the common needs of the parties in a context. Secondly, specialized brokering services 21132 can be written, which are servers themselves that can be brought into a context. A brokering service uses the generic negotiation mechanism provided by the middleware to gather the service-related attributes of the parties in the context, enabling it to bring other service managers 21209–21211 into the context that can meet their, perhaps diverse, needs. And finally, the middleware supports the development of implicit brokers which, as policies of context server 21201, can examine the attributes of the context and its members to bring services into the context. This sort of broker might be used, for example, to bring billing services into the context. These brokering mechanisms can also be used in unison. A specialized broker may, for example, gather parties' attributes and formulate a complex query to trading service 21124 to locate the right service.

The middleware provides a framework for introducing a level of signaling and control for communications sessions that fits logically above the transport network. This means that software can be written to formalize communications that are required to set up calls. The middleware supports codification of the signaling used for service composition and separates it from that used for control of bearer channels and network connections. A member context agent 21203–21207 of context agent facility 21202 utilizes virtual transport to access underlying transport services for establishing a signaling connection to a context server 21201, which, in turn, is then able to establish signaling connections with other member context agents 21203–21207. Context agent facility 21202 utilizes a transaction protocol with context server 21201 to create a context 21200 for a communications session and to associate parties 21220–21221 and service managers 21209–21211 with the context. Integral to this transaction protocol, the middleware provides a foundation for negotiation among parties' service agents 21230–21233 and service managers 21209–21211 which allows media-specific service agents 21230–21233 and service managers 21209–21211 to agree on service-specific parameters regarding the communications session. The specific negotiation protocol, as defined in common for a specific media service, is implemented in replaceable program entities (policies) which are bound to context transaction processing.

While the communications model supports familiar communication system features (with parties and transport), more elaborate communications in which multiple parties and a rich array of services are added and removed dynamically are also supported naturally within the model. For example, a two-party voice call can be turned into a multiparty conference with a video and a multipoint shared application by adding additional parties, a video-connection service, and a shared-data service to the context. Further, since the services in a context may be independent of one another, each can be added and removed at any time without affecting the others. These attributes of the model result from the concept of context and the fact that the signaling for bearer-channel connection-control and for establishment and control of the context are separate.

A second example illustrates additional attributes of this model. If an interactive service (such as "800"-number video-catalog shopping) were desired, an endpoint would be able to request the service and negotiate the attributes of the service to conform to its own capabilities. But then, the service itself could request that required ancillary services be added to the context, such as billing, order processing, and credit card authorization. This illustrates the fundamental symmetry of the middleware architecture that provides parties and services with the same status in a context, thus allowing all members the full power of the context transaction protocol.

As shown in FIG. 20, the middleware is constructed as follows. There are six architectural elements to the middleware platform:

Context service 20120: The context service provides the supporting mechanisms for the middleware model of communications that provides a context for a communications session in which service providers and service users are treated as undifferentiated members with equal privileges and capabilities. Context service 20120 is provided by interactions between a context server 21201 that manages a context 21200 and a context agent 21202 that represents the members of the context. Communications with context service 20120 are effected through a context API 20121. Context API 20121 is available to both applications software and service modules. This means that, although policy modules will normally buffer applications from context transactions, negotiation, and service control, it is possible for applications to directly react to and influence these activities.

Naming service 20122: A distributed naming database that allows the middleware and middleware-based applications to access transport addresses associated with a middleware identifier (CWID). Each service manager 21209–21211 and party 21220–21221 has its own CWID. The naming service performs two mappings: 1) a mapping from a middleware CWID to a transport-independent address (a virtual transport address, or VTA), and (2) a mapping from a VTA to transport-dependent addresses and attributes. The attributes associated with each VTA illustratively consist of "attribute name; attribute value" pairs, where there is a fixed set of attribute names supported. Service agents 21230–21233 use the first mapping to get the VTA for a given party or service manager and then give the resulting VTA to virtual transport service 20126, which calls on naming service 20122 to perform the second mapping in order to obtain actual transport addresses for establishing transport connections to these parties and service managers. Communications with naming service 20122 are effected through a naming API 20123.

Trading service 20124: Trading in the middleware is service selection based on combined attributes of the members of a context. Trading service 20124 is a database that supports service registration and the ability to locate service managers 21209–21211 by required attributes. Trading service 20124 has the ability to satisfy queries from service agents 21230–21233 that require it to find the "best match" of party attributes to service attributes. Service managers register with the trading database. Brokers can be developed in the middleware that use trading service 20124 to find a best match for the collective needs of the members of a context. Communications with trading service 20124 are effected through a trading API 20125.

Remote object management (ROM) service 20127: The ROM service is a simple object request broker (in the object-oriented programming sense). It uses virtual transport service 20126 to allow object methods to be invoked remotely. ROM service 20127 is available to both the middleware itself and to applications and policy modules. Policy modules may make use of ROM service 20127 to establish out-of-context communications channels with peer or server policy modules. Applications make use of ROM service 20127 to establish client-server connections.

Virtual transport service 20126: An abstraction of transport that presents a common model for a variety of communications networks. The use of virtual transport enhances the portability of applications and services and their interoperability in heterogeneous network environments. Each entity in the middleware is given a virtual transport address (VTA) which allows addressing of and connecting to that entity in a network-independent manner.

In addition to these elemental services, the middleware provides a programming framework and associated libraries to facilitate development of run-time libraries that implement protocols for middleware-compliant service access and control 20130 and brokering services 20132. The program entities that are developed within this framework are objects (in the object-oriented programming sense), called policy modules or policies, that implement service and access control 20130 and brokering services 20132, and constitute the client/server software that provides services and service access. In other words, service managers 21209–21211 and service agents 21230–21233 are policies that perform the service-specific negotiation and control functions that are required for service delivery.

To control independently a dynamic mixture of services, the concept of context provides a place to instantiate a locus of control for the composition of these services and facilitates the multi-way negotiation needed to deliver the services to a variety of endpoints. This requires that the detailed attributes of various media services (feature control mechanisms, encoding choices, transport requirements, delay and synchronization characteristics, etc.) be understood and agreed-to by service providers (service managers 21209–21211) and service users (parties 21220–21221).

The middleware introduces the idea of "negotiation" among members, typically between parties and service managers, to allow services to be provided in a manner that ensures compatibility and consistency of service delivery to the parties. The middleware provides a framework for incorporating policy modules into a system that are available for use by applications for performing service-specific negotiation in reaction to changes to the context. Policy modules can also be used during service delivery to provide service-control functions, e.g., to tell a video server which video stream to send. Policy modules are essentially service-specific run-time libraries that implement service-specific negotiation and control protocols. Communications by applications 113 with policy modules of service access and control 20130 are effected through a service control API 20131.

Context service 20120 with appropriate policy modules enables deployment of new multimedia services without having to enhance underlying network equipment. Naming service 20122 and trading service 20124 also facilitate service composition by enabling applications to locate the services that are needed to meet the needs of the members in a context. Brokering services 20132 can be created that perform the function of gathering up appropriate party attributes, formulating the required trader query, and inviting the returned service manager into the context. These brokers generally are service-type specific (e.g., audio, video, shared application), and are implemented as separate services that can be added to a context. Broker agents work with the brokering server to locate the needed service manager and add it to the context. In some cases, a broker may be implemented as a policy module of context server 21201 which, by virtue of its ability to eavesdrop on all context transactions, can perform a service-location function. Naming service 20122 complements the brokering service by providing a facility for converting a middleware entity name to the transport network attributes required to connect to that entity.

Naming service 20122 serves both applications 20113 and virtual transport service 20126. Applications typically use naming service 20122 to map a qualified CWID, (e.g., an E.164-conformant address, such as a phone number) into a virtual transport address (VTA, e.g., also an E.164-conformant address). The VTA appended with a logical-port identifier is "handed" to virtual transport service 20126 which uses naming service 20122, once again, to map the qualified VTA to transport-specific attributes. For example, say that a user has a CWID of 303.538.4071, then naming service 20122 would be used by a context server 21201 to map 303.538.4071.context_port to the VTA of that user's member context agent, which might be 303.538.4000. When the context server 21201 wishes to establish a connection to the context agent's port for accepting context messages, it asks virtual transport service 20126 to establish a connection to 303.538.4000.context_port. Virtual transport service 20126 would, in turn, use naming service 20122 to map 303.538.4000.context_port to the transport specific address (es) of the appropriate virtual port on context agent 21202.

This description of the middleware applies fundamentally to both MMCX server 1933 and endpoints 1937–1939, although APIs 20121, 20123, and 20125 are the only portions of services 20120, 20122, and 20124 that are used on endpoints 1937–1939. A distributed client/server architecture is utilized whereby client software (service agents 21230–21233) in an endpoint 1937–1939 works cooperatively with server software (service managers 21209–21211) in server 1933 to provide the brokering services as well as the media-control services which provide the value-added communications services to users.

Figure 22B:
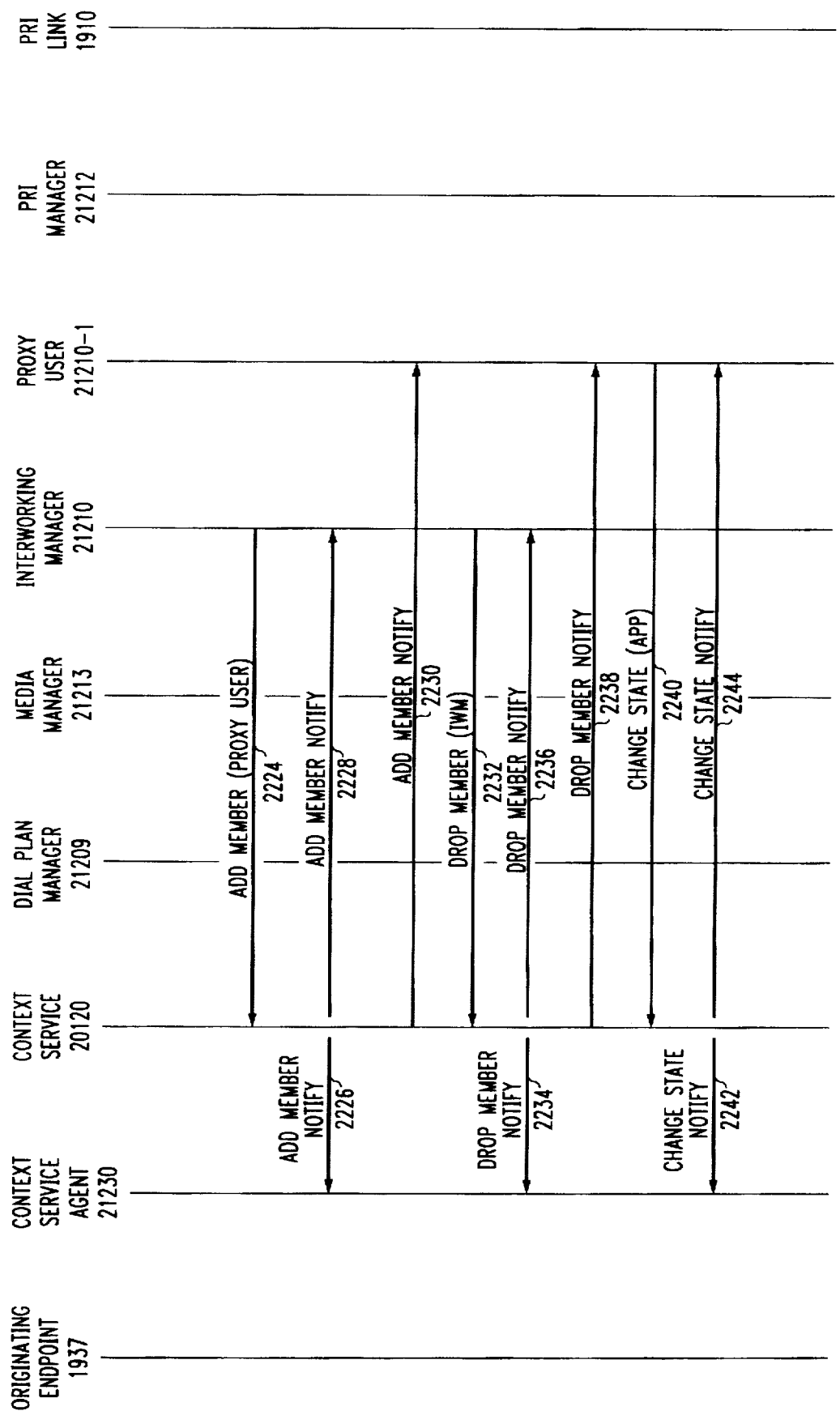
Figure 22C:
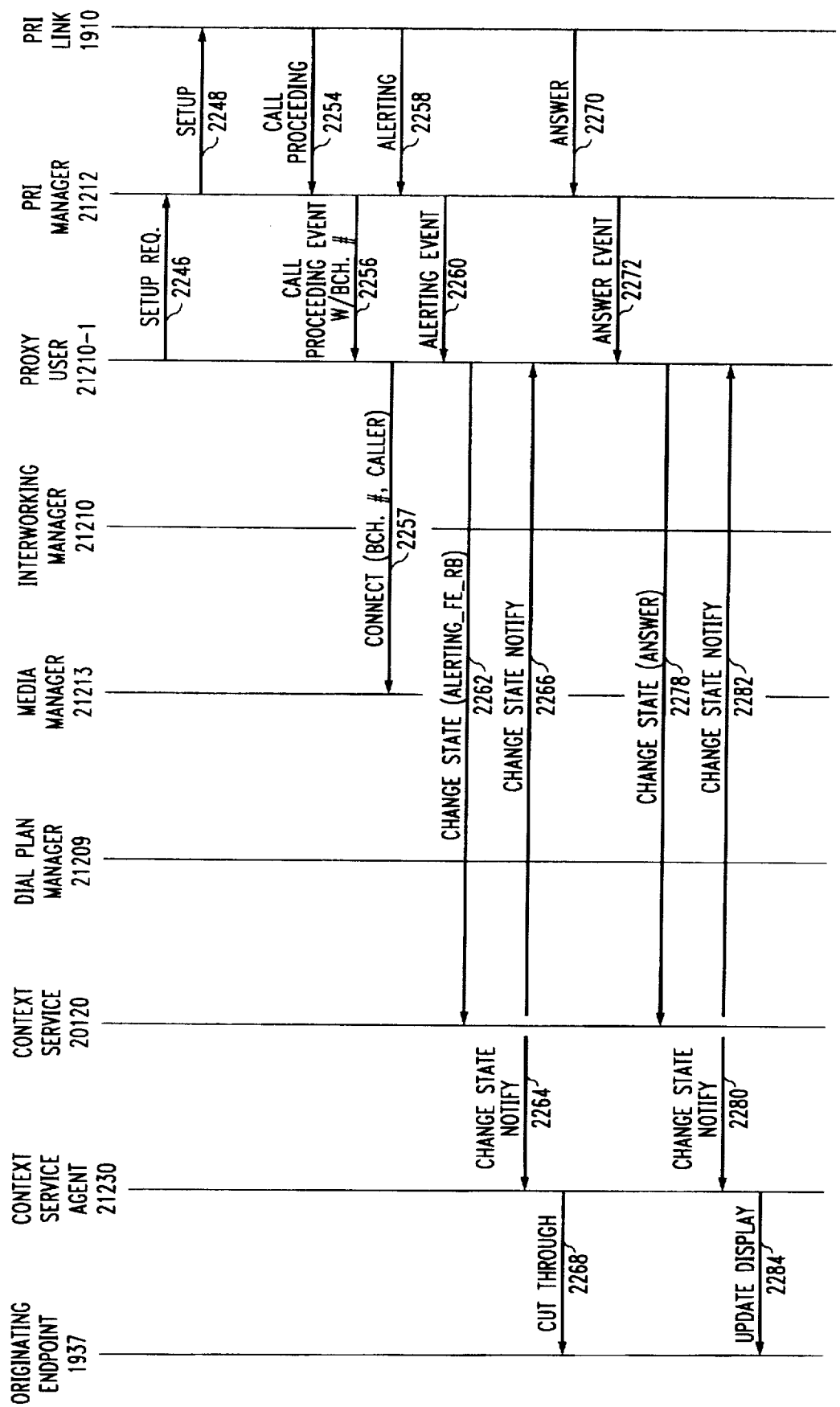

FIGS. 22A–C illustrate the scenario for setting up an outgoing call from an endpoint 1937–1939 in subsystem 1911 to an endpoint 1918–1919 in subsystem 1912. To keep the illustration simple, each triad of "request event approval; event approval; event notification" messages between a context and a member of the context is represented in FIGS. 22A–C by a single arrow labeled with the name of the event followed by "notify". Along with FIGS. 22A–C, reference may be made to FIG. 24, which is the general FIG. 21 modified to represent the particular, inter-subnetwork, call scenarios of FIGS. 22A–C and 23A–B.

Assume that party 21220 is logged in at endpoint 1937 and places a call from endpoint 1937 to endpoint 1918 by dialing a dial access code plus the telephone number of endpoint 1918 on a "soft phone" presented to party 21220 on the display screen of endpoint 1937, at step 2200. In response, context service agent 21230 (also known as the context user engine) sends a message to dial plan manager (a service manager) 21209 conveying the dialed number, at step 2201. Dial-plan manager 21209 is a translation database that translates the dialed number into a corresponding CWID, and returns the CWID to context service agent 21230, at step 2202. Since the dialed number is not a part of the numbering plan of subnetwork 1933, the returned CWID corresponds to an interworking manager (IWM) 21210. Context service agent 21230 then sends a "create context" request to context service 20120, at step 2203. Context service 20120 performs a "create context notify", at step 2204, and creates a context 21200 for the call. In response, context service agent 21230 sends an "add member" request to context service 20120 identifying itself (or more precisely, containing the CWID of party 21220) as the party to be added, at step 2205. Context service 20120 performs an "add member notify", at step 2206, and adds party 21220 to context 21200. Context service agent 21230 now sends an "add member" request containing the CWID returned by dial plan manager 21209 and the called number to context service 20120, at step 2212. Context service 20120 performs an "add member notify" containing the calling party CWID and the called number with both context service agent 21230 and interworking manager 21210, at steps 2214 and 2216, and adds interworking manager 21210 to context 21200.

Interworking manager 21210 comprises a pool of proxy users 21210-1 through 21210-2. Each proxy user is a policy; it is an equivalent of a service agent, but executes on server 1933 instead of on an endpoint 1937–1939. Each proxy user has its own CWID, and interworking manager 21210 maintains a list of these CWIDs along with an indication of whether the corresponding proxy user is unallocated (idle) or allocated to a call. Interworking manager 21210 responds to being added to the context by selecting an idle proxy user 21210-1 and adding it to context 21200 by sending an "add member" message accompanied by the proxy user's CWID, the calling party CWID, and the called number to context service 20120, at step 2224. Context service 20120 performs an "add member notify" containing the calling party CWID and the called number with context service agent 21230, interworking manager 21210, and proxy user 21210-1, at steps 2226, 2228, and 2230, and adds proxy user 21210-1 to context 21200. Interworking manager 21210 now requests to drop out of the call by sending a "drop member" request identifying itself to context service 20120, at step 2232. Context service 20120 performs a "drop member notify" with context service agent 21230, interworking manager 21210, and proxy user 2120-1, at steps 2234, 2236, and 2238, and removes interworking manager 21210 from context 21200.

Proxy user 2120-1 now changes its state to "approved" by sending a "change state" request to context service 20120, at step 2240. Context service 20120 performs a "change state notify" with context service agent 21230 and proxy user 2120-1, at steps 2242 and 2244. Proxy user 2120-1 now sends a "setup" request message conveying the calling party CWID and the called number to PRI manager 21212, at step 2246. PRI manager 21212 responds by allocating an available B channel on PRI link 1910 to the call, causing ISDN port circuit 1940 to seize PRI link 1910, and transmitting an ISDN Q.931 "setup" message on the signaling channel of PRI link 1910 to telephone switching system 1913, at step 2248. System 1913 responds to the "setup" message in a conventional manner.

When telephone switching system 1913 responds to the "set up" message with an ISDN "call proceeding" message over PRI link 1910, at step 2254, PRI manager 21212 detects the "call proceeding" message and sends a "call proceeding" event notification conveying the number of the B channel that is allocated to the call to proxy user 2120-1, at step 2256. In response, proxy user 2120-1 sends a connection request conveying the B channel number and the calling party CWID to media manager (a service manager) 21213, at step 2257, and media manager 21213 causes a connection manager (a service manager) 21211 to establish a bidirectional virtual call path between the identified B channel at ISDN port circuit 1940 and end-point 1937 through LAN 1936.

When telephone switching system 1913 rings the called telephone 1918, it sends an ISDN "alerting" message over PRI link 1910, at step 2258. PRI manager 21212 detects the alerting message and sends an "alerting" event notification to proxy user 2120-1, at step 2260. Proxy user 2120-1 responds to receipt of the "call proceeding" and "alerting" event notifications by requesting of context service 20120 a change of state to the "alerting far end ringback" state, at step 2262. Context service 20120 responds by performing a "change state notify" with context service agent 21230 of originating endpoint 1937 and proxy user 2120-1, at steps 2264 and 2266. Context service agent 21230 responds by causing the call path that was set up as a result of step 2252 to be cut through to the user of originating endpoint 1937, at step 2268. This involves connecting the call path to the microphone and loudspeaker of endpoint 1937 and updating the display of endpoint 1937 to indicate to the caller that the called telephone is ringing. When the called telephone 1918 is answered, telephone switching system 1913 sends an ISDN "answer" message on PRI link 1910, at step 2270, and PRI manager 21212 responds thereto by sending an "answer" event notification to proxy user 2120-1, at step 2272. Proxy user 2120-1 responds by requesting of context service 20120 a change of state to the "answer" state, at step 2278. Context service 20120 performs a "change state notify" with context service agent 21230 and proxy user 2120-1, at steps 2280 and 2282. Context service agent 21230 then updates the display of endpoint 1937 to indicate to the caller that the call has been answered, at step 2284. The caller and call recipient can now converse.

Figure 23A:
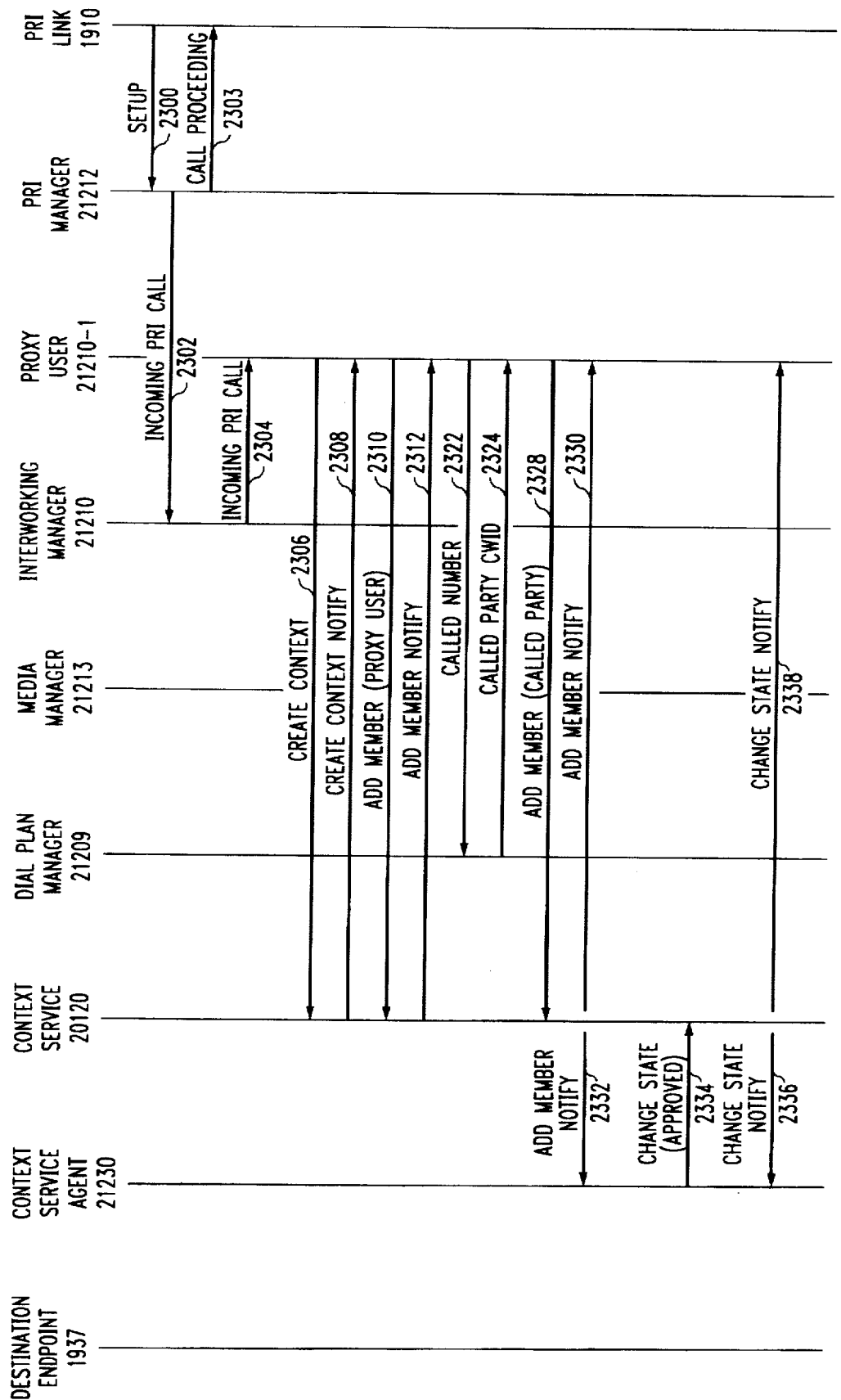
Figure 24:
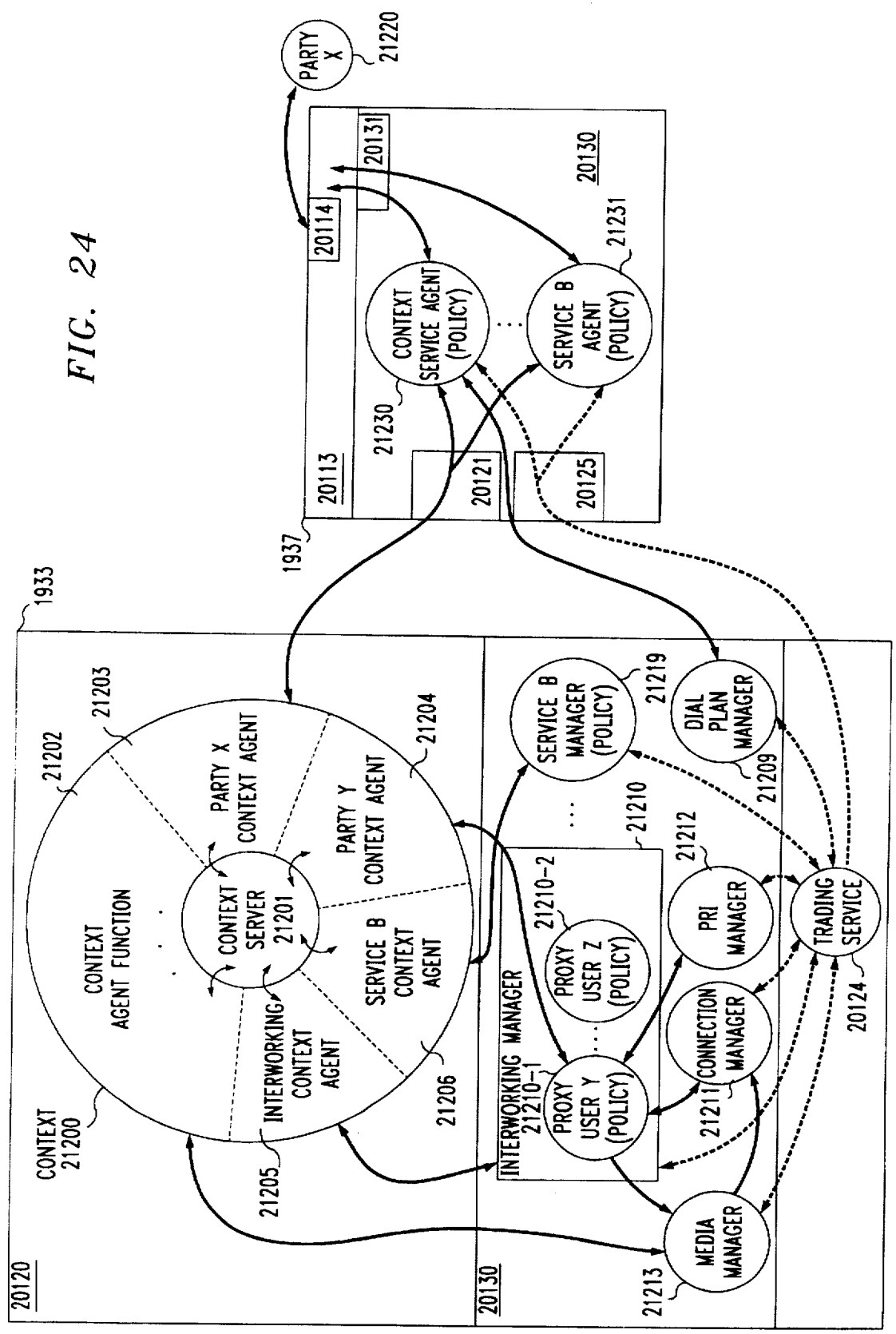
FIG. 24 is the block diagram of FIG. 21 modified to represent the call scenarios of FIGS. 22 and 23.

FIGS. 23A–B illustrate the scenario for setting up an incoming call to an endpoint 1937–1939 in subsystem 1911 from an endpoint 1918–1919 in subsystem 1912. As in FIGS. 22A–C, each triad of "request event approval; event approval; event notification" messages is represented in FIGS. 23A–B by a single arrow labeled with the name of the event followed by "notify". Along with FIGS. 23A–B, reference may again be made to FIG. 24. When telephone 1918 calls endpoint 1937, telephone switching system 1913 sends an ISDN Q.931 "setup" message over PRI link 1910, at step 2300. The message contains the calling and called numbers and the number of a B channel of PRI link 1910 selected for the call. PRI manager 21212 receives the "setup" message and responds by sending an "incoming PRI call" notification including the called number and the number of the B channel to interworking manager 21210, at step 2302, and sending an ISDN "call proceeding" message via PRI link 1910 to telephone switching system 1913, at step 2303. Interworking manager 21210 responds by selecting from the proxy user CWID pool the CWID of an idle proxy user 2120-1 and forwarding to that proxy user 2120-1 the "incoming PRI call" notification, at step 2304. In response, proxy user 2120-1 requests context service 20120 to create a context for the call, at step 2306. Context service 20120 performs a create context notify with proxy user 2120-1 and creates context 21200, at step 2308. Proxy user 2120-1 then requests context service 20120 to add proxy user 2120-1 to the context, at step 2310. Context service 20120 performs an "add member notify" with proxy user 2120-1 and adds it to the context, at step 2312. Proxy user 2120-1 then sends the called number to dial plan manager 21209 for translation into a CWID of the called party, at step 2322. Dial-plan manager 21209 obliges and returns the called party CWID to proxy user 2120-1, at step 2324. Proxy user 2120-1 now requests context service 20120 to add the called party as a member to the context, at step 2328. Context service 20120 performs an "add member notify" with proxy user 2120-1 and context service agent 21230 of the called party's endpoint 1937, at steps 2330 and 2322, and adds the called party to the context. Context service agent 21230 of the called party's endpoint 1937 then makes a request of context service 20120 to change its state to "approved", at step 2334.

Context service 20120 performs a "change state notify" with context service agent 21230 and proxy user 2120-1, at steps 2336 and 2338, and context service agent 21230 changes its state to "approved". Context service agent 21230 then sends a "connect" message to media manager 21213 at step 2340. proxy user 21210-1 sends a "connect" message conveying the number of the B channel that is allocated to the call to media manager 21213 at step 2342, and in response, media manager 21213 causes connection manager 21211 to connect the called party to the B channel of PRI link 1910 via LAN 1936. Context service agent 21230 then makes a request of context service 20120 to change its state to "alerting", at step 2344. Context service 20120 performs a "change state notify" with context service agent 21230 and proxy user 21210-1, at steps 2346 and 2348, and context service agent 21230 changes its state to "approved". Context service agent 21230 then causes destination endpoint 1937 to alert its user (e.g., generate a ringing tone and/or flash an "incoming call" message on the display), at step 2350.

In response to the context service agent's change of state, proxy user 2120-1 sends an "alerting" notification to PRI manager 21212, at step 2352, and PRI manager 21212 sends an ISDN "alerting" message over PRI link 1910 to telephone switching system 1912, at step 2354. Proxy user 2120-1 then makes a request of context service 20120 to change its state to "feedback", at step 2356. Context service 20120 performs a "change state notify" with proxy user 2120-1 and context service agent 21230, at steps 2358 and 2360, and proxy user 2120-1 changes its state to "feedback".

When the user of endpoint 1937 answers the call, at step 2362, context service agent 21230 causes the call path that was set up in response to step 2342 to be cut through to the microphone and loudspeaker of endpoint 1937, at step 2364, and makes a request of context service 20120 to change its state to "answer", at step 2366. Context service 20120 performs a "change state notify" with context service agent 21230 and proxy user 2120-1, at steps 2368 and 2370, and context service agent 21230 changes its state to "answer". In response, proxy user 2120-1 sends a call "answered" notification to PRI manager 21212, at step 2372, and PRI manager 21212 sends an ISDN "answered" message over PRI link 1910 to telephone switching system 1912, at step 2374. The caller and call recipient can now converse.

Of course, various changes, modifications, and extensions to the illustrative embodiments described above will be apparent to those skilled in the art. For example, the inter-subsystem PRI link may be replaced with any suitable medium operating with any suitable protocol, such as a LAN operating with the H.323 protocol. Also, the sub-system 1912 may be a duplicate of the sub-system 1911. Alternatively, PRI link 1910 and telephone switching system 1913 may be replaced by a LAN (e.g., operating with the H.323 protocol) and telephones 1918–1919 may be replaced by multimedia workstations. Such changes and modifications can be made without departing from the spirit and the scope of the invention and without diminishing its attendant advantages. It is therefore intended that such changes and modifications be covered by the following claims.

The invention claimed is:

1. A telecommunications apparatus comprising:
   a plurality of first user terminals;
   a first communications medium interconnecting the first user terminals;
   first call processing means for interacting with the first user terminals via a first protocol to effect communications sessions between the first user terminals over the first communications medium;

27 a plurality of second user terminals;

a second communications medium interconnecting the second user terminals;

second call processing means for interacting with the second user terminals via a second protocol different from the first protocol to effect communications sessions between the second user terminals over the second communications medium; and proxy user means connected to the first medium and to the second medium for interacting on behalf of a second user terminal with the first call processing means via the first protocol like the first user terminals and for interacting on behalf of a first user terminal with the second call processing means via the second protocol like the second user terminals to cause the first call processing means and the second call processing means to effect a communications session between the first user terminal and the second user terminal over the first communications medium and the second communications medium, wherein the proxy user means comprise control signaling means connected to the first call processing means for interacting with the first call processing means on behalf of the second user terminal via control signals of the first protocol, and also connected to the second call processing means for interacting with the second call processing means on behalf of the first user terminal via control signals of the second protocol, and interface means interconnecting the first medium with the second medium, for receiving first user communications from the first user terminal via the first medium and the first protocol on behalf of the second user terminal and transmitting the received first user communications to the second user terminal via the second medium and the second protocol on behalf of the first user terminal, and for receiving second user communications from the second user terminal via the second medium and the second protocol on behalf of the first user terminal and transmitting the received second user communications to the first user terminal via the first medium and the first protocol on behalf of the second user terminal.

2. A telecommunications apparatus comprising:

a plurality of first user terminals;

a first communications medium interconnecting the first user terminals;

first call processing means for interacting with the first user terminals via a first protocol to effect communications sessions between the first user terminals over the first communications medium;

a plurality of second user terminals;

a second communications medium interconnecting the second user terminals;

second call processing means for interacting with the second user terminals via a second protocol different from the first protocol to effect communications sessions between the second user terminals over the second communications medium; and proxy user means connected to the first medium and to the second medium for interacting on behalf of a second user terminal with the first call processing means via the first protocol like the first user terminals and for interacting on behalf of a first user terminal with the second call processing means via the second protocol

28 like the second user terminals to cause the first call processing means and the second call processing means to effect a communications session between the first user terminal and the second user terminal over the first communications medium and the second communications medium, wherein the first call processing means comprise a stored-program-controlled server of a client-server system that comprises a client and the server which executes a server program;

each first user terminal comprises a stored-program-controlled said client of the client-server system which executes a client program; and the proxy user means comprise a client program which executes on the server.

3. The apparatus of claim 1 wherein:

the first call processing means comprise a stored-program-controlled server of a client-server system that comprises a client and the server which executes a server program;

each first user terminal comprises a stored-program-controlled said client of the client-server system which executes a client program;

the control signaling means comprise a client program which executes on the server and converts control signals of the first protocol into control signals of the second protocol and vice versa; and the interface means comprise at least one port circuit that transmits the first user communications, receives the second user communications, and transmits and receives the control signals of the second protocol, on the second medium via the second protocol and that communicates the control signals of the second protocol to and from the client program of the proxy user means.

4. The apparatus of claim 3 wherein:

the client program of the control signaling means comprises an object-oriented-programming object, and each second user terminal that is involved in a communication session with a first user terminal is represented in he server by a separate instance of the object.

5. The apparatus of claim 4 wherein:

the first protocol is a middleware protocol, and the second protocol is an ISDN protocol.

6. A proxy user arrangement for a telecommunications system that includes a plurality of first user terminals, a first communications medium interconnecting the first user terminals, a first call processor for interacting with the first user terminals via a first protocol to effect communications sessions between the first user terminals over the first communications medium, a plurality of second user terminals, a second communications medium interconnecting the second user terminals, and a second call processor for interacting with the second user terminals via a second protocol different from the first protocol to effect communications sessions between the second user terminals over the second communications medium, the proxy user arrangement comprising:

first means connectable to the first medium for interacting on behalf of a second user terminal with the first call processor via the first protocol like the first user terminals; and second means connectable to the second medium for interacting on behalf of a first user terminal with the second call processor via the second protocol like the second user terminals;

thereby to cause the first call processor and the second call processor to effect a communications session between the first user terminal and the second user terminal over the first communications medium and the second communications medium, wherein the first means comprise
- first control signaling means connected to the first call processor for interacting with the first call processor on behalf of the second user terminal via control signals of the first protocol, and
- first interface means interconnecting the first medium with the second medium, for receiving second user communications from the second user terminal via the second medium and the second protocol on behalf of the first user terminal and transmitting the received second user communications to the first user terminal via the first medium and the first protocol on behalf of the second user terminal; and the second means comprise
- second control signaling means connected to the second call processor for interacting with the second call processor on behalf of the first user terminal via control signals of the second protocol, and
- second interface means interconnecting the first medium with the second medium, for receiving first user communications from the first user terminal via the first medium and the first protocol on behalf of the second user terminal and transmitting the received first user communications to the second user terminal via the second medium and the second protocol on behalf of the first user terminal.

7. A proxy user arrangement for a telecommunications system that includes a plurality of first user terminals, a first communications medium interconnecting the first user terminals, a first call processor for interacting with the first user terminals via a first protocol to effect communications sessions between the first user terminals over the first communications medium, a plurality of second user terminals, a second communications medium interconnecting the second user terminals, and a second call processor for interacting with the second user terminals via a second protocol different from the first protocol to effect communications sessions between the second user terminals over the second communications medium, the proxy user arrangement comprising:

- first means connectable to the first medium for interacting on behalf of a second user terminal with the first call processor via the first protocol like the first user terminals; and
- second means connectable to the second medium for interacting on behalf of a first user terminal with the second call processor via the second protocol like the second user terminals;

thereby to cause the first call processor and the second call processor to effect a communications session between the first user terminal and the second user terminal over the first communications medium and the second communications medium, wherein the first call processor comprises a stored-program-controlled server of a client-server system that comprises a client and the server which executes a server program, each first user terminal comprises a stored-program-controlled said client of the client-server system which executes a client program, and the proxy user arrangement comprises a client program for execution on the server.

8. The proxy user arrangement of claim 6 for a telecommunications system wherein the first call processor comprises a stored-program-controlled server of a client-server system that comprises a client and the server which executes a server program, and each first user terminal comprises a stored-program-controlled said client of the client-server system which executes a client program, wherein:

the first and second control signaling means together comprise a client program which executes on the server and converts control signals of the first protocol into control signals of the second protocol and vice versa; and the first and second interface means together comprise at least one port circuit that transmits the first user communications, receives the second user communications, and transmits and receives the control signals of the second protocol, on the second medium via the second protocol and that communicates the control signals of the second protocol to and from the client program of the proxy user means.

9. The proxy user arrangement of claim 8 wherein:

the client program of the first and second control signaling means comprises an object-oriented-programming object, and each second user terminal that is involved in a communications session with a first user terminal is represented in the server by a separate instance of the object.

10. The proxy user arrangement of claim 9 wherein:

the first protocol is a middleware protocol, and the second protocol is an ISDN protocol.

11. A method of communicating between a first endpoint and a second endpoint in a telecommunications system that includes a plurality of first user terminals, a first communications medium interconnecting the first user terminals, a first call processor for interacting with the first user terminals via a first protocol to effect communications sessions between the first user terminals over the first communications medium, a plurality of second user terminals, a second communications medium interconnecting the second user terminals, a second call processor for interacting with the second user terminals, via a second protocol different from the first protocol to effect communications sessions between the second user terminals over the second communications medium, and an interface that interconnects the second communications medium with the first communications medium, the method comprising the steps of:

the interface interacting with the first call processor on behalf of the second user terminal via control signals of the first protocol like the first user terminals;

the interface receiving second user communications from the second user terminal via the second medium and the second protocol on behalf of the first user terminal;

the interface transmitting the received second user communications to the first user terminal via the first medium and the first protocol on behalf of the second user terminal;

the interface interacting with the second call processor on behalf of the first user terminal via control signals of the second protocol like the second user terminals;

the interface receiving first user communications from the first user terminal via the first medium and the first protocol on behalf of the second user terminal; and the interface transmitting the received first user communications to the second user terminal via the second medium and the second protocol on behalf of the first user terminal;

thereby to cause the first call processor and the second call processor to effect a communications session between the first user terminal and the second user terminal over the first communications medium and the second communications medium.

12. A method of communicating between a first endpoint and a second endpoint in a telecommunications system that includes a plurality of first user terminals, a first communications medium interconnecting the first user terminals, a first call processor for interacting with the first user terminals via a first protocol to effect communications sessions between the first user terminals over the first communications medium, a plurality of second user terminals, a second communications medium interconnecting the second user terminals, a second call processor for interacting with the second user terminals via a second protocol different from the first protocol to effect communications sessions between the second user terminals over the second communications medium, and an interface that interconnects the second communications medium with the first communications medium, the method comprising the steps of:

the interface interacting on behalf of the second user terminal with the first call processor via the first protocol like the first user terminals; and the interface interacting on behalf of the first user terminal with the second call processor via the second protocol like the second user terminals;

thereby to cause the first call processor and the second call processor to effect a communications session between the first user terminal and the second user terminal over the first communications medium and the second communications medium, wherein the first call processor comprises a stored-program-controlled server of a client-server system that comprises a client and the server which executes a server program, each first user terminal comprises a stored-program-controlled said client of the client-server system which executes a client program, and the steps of interacting together comprise the step of executing a client program of the client-server system on the server.

13. The method of claim 11 in a telecommunications system wherein the first call processor comprises a stored-program-controlled server of a client-server system that comprises a client and the server which executes a server program, and each first user terminal comprises a stored-program-controlled said client of the client-server system which executes a client program, wherein:

the steps of interacting via the control signals together comprise the steps of executing a client program of the client-server system on the server to convert control signals of the first protocol into control signals of the second protocol and vice versa, receiving the second user communications on the second medium from the second user, transmitting the received second user communications on the first medium to the first user, receiving the first user communications on the first medium from the first user, transmitting the received first user communications on the second medium to the second user, transmitting and receiving the control signals of the second protocol on the second medium via the second protocol, and communicating the control signals of the second protocol to and from the client program executing on the server.

14. The method of claim 13 in a telecommunications system wherein the client program executing on the server comprises an object-oriented-programming object, wherein:

the step of executing a client program on the server comprises the step of executing a separate instance of the object on the server for each second user terminal that is involved in a communications session with a first user terminal.

15. The method of claim 14 in a telecommunications system wherein:

the first protocol is a middleware protocol, and the second protocol is an ISDN protocol.

\* \* \* \* \*